United States Patent
Tsunoda

(10) Patent No.: US 10,762,774 B2
(45) Date of Patent: Sep. 1, 2020

(54) PROGRAM, METHOD, AND APPARATUS FOR COMPUTING INDEX ON SEDIMENT DISASTER

(71) Applicant: FUJITSU LIMITED, Kawasaki-shi, Kanagawa (JP)

(72) Inventor: Tomoyuki Tsunoda, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/290,575

(22) Filed: Mar. 1, 2019

(65) Prior Publication Data
US 2019/0272739 A1 Sep. 5, 2019

(30) Foreign Application Priority Data
Mar. 5, 2018 (JP) .................................. 2018-038776

(51) Int. Cl.
| | | |
|---|---|---|
| G08B 31/00 | (2006.01) | |
| G06N 7/00 | (2006.01) | |
| G06N 3/02 | (2006.01) | |
| G01W 1/14 | (2006.01) | |

(52) U.S. Cl.
CPC ............ *G08B 31/00* (2013.01); *G01W 1/14* (2013.01); *G06N 7/005* (2013.01); *G06N 3/02* (2013.01)

(58) Field of Classification Search
CPC .. G06N 3/08; G06N 5/04; G06N 3/02; G01K 13/08; G06F 30/23; G06F 30/20; G01N 33/383; G01N 33/24; G08B 31/00
See application file for complete search history.

(56) References Cited

U.S. PATENT DOCUMENTS

| | | | | | |
|---|---|---|---|---|---|
| 5,615,950 | A | * | 4/1997 | Frei ....................... | B01F 11/008 366/173.1 |
| 10,182,225 | B1 | * | 1/2019 | Cui .......................... | G06T 7/60 |
| 10,497,129 | B1 | * | 12/2019 | Cui ......................... | G05D 1/101 |
| 2014/0087273 | A1 | * | 3/2014 | Christensen .......... | H01M 12/02 429/406 |
| 2014/0156232 | A1 | * | 6/2014 | Cordazzo ................ | G06F 30/23 703/2 |
| 2015/0355158 | A1 | * | 12/2015 | Lander .................. | G01N 33/383 702/2 |
| 2017/0039307 | A1 | * | 2/2017 | Koger ..................... | G06F 30/13 |
| 2017/0061052 | A1 | * | 3/2017 | Gates ...................... | G06N 5/04 |

(Continued)

FOREIGN PATENT DOCUMENTS

| | | |
|---|---|---|
| JP | 2004-3274 | 1/2004 |
| JP | 2004-346653 | 12/2004 |

(Continued)

*Primary Examiner* — Hoi C Lau
(74) *Attorney, Agent, or Firm* — Fujitsu Patent Center

(57) ABSTRACT

A method for computing an index on a sediment disaster, performed by a computer, the method includes: creating a computation model for computing the index on a sediment disaster at a specific point using information on a geometry of a precipitation zone at the specific point and long rainfall and short rainfall at the specific point, the information being created from past precipitation data accumulated in a storage unit; and computing the index on a sediment disaster using the computation model from the information on the geometry of the precipitation zone at the specific point, the information being created from the input precipitation data.

8 Claims, 21 Drawing Sheets

(56) References Cited

U.S. PATENT DOCUMENTS

| | | | |
|---|---|---|---|
| 2019/0227194 A1* | 7/2019 | Zhao | G01S 13/958 |
| 2019/0254242 A1* | 8/2019 | Allen | A01G 25/02 |
| 2019/0257810 A1* | 8/2019 | Lander | G01N 33/24 |
| 2019/0272739 A1* | 9/2019 | Tsunoda | G06N 3/08 |

FOREIGN PATENT DOCUMENTS

| | | |
|---|---|---|
| JP | 2010-197185 | 9/2010 |
| JP | 2010-271877 | 12/2010 |
| JP | 2015-232537 | 12/2015 |

* cited by examiner

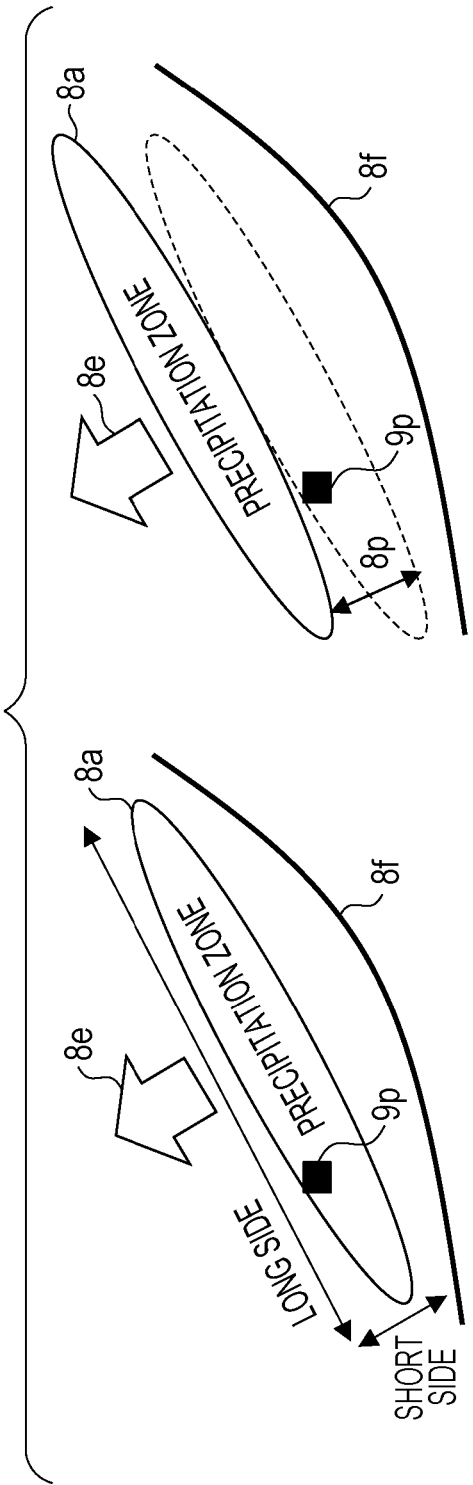
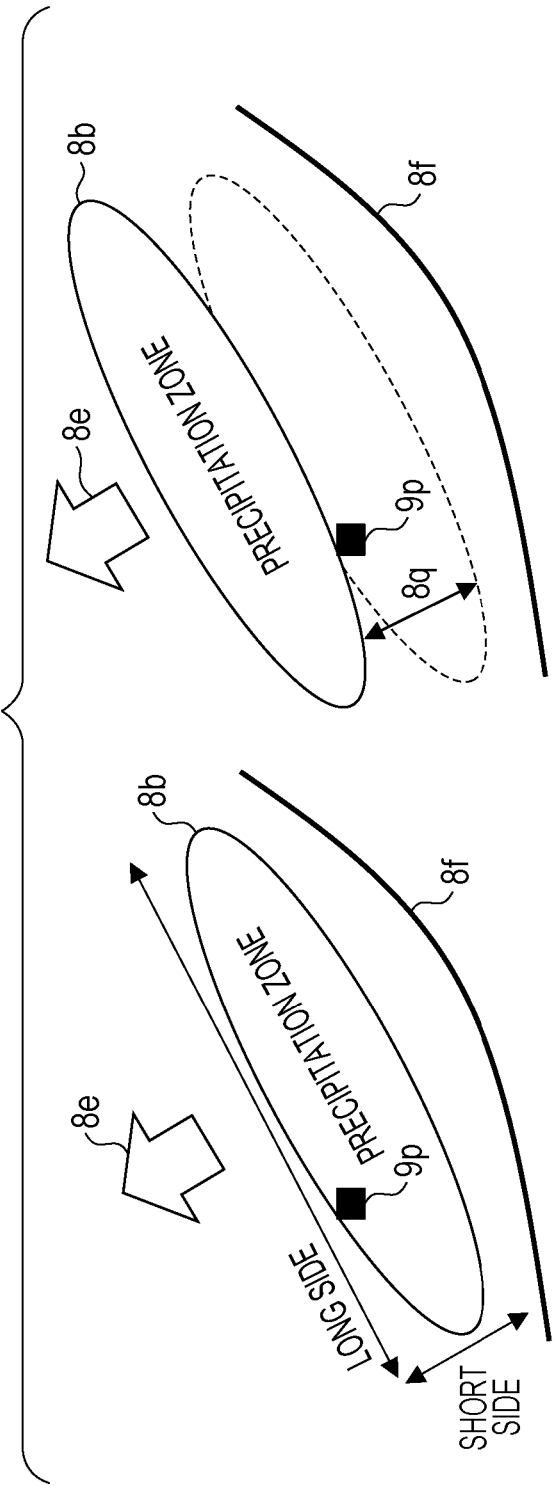

PROGRAM, METHOD, AND APPARATUS FOR COMPUTING INDEX ON SEDIMENT DISASTER

CROSS-REFERENCE TO RELATED APPLICATION

This application is based upon and claims the benefit of priority of the prior Japanese Patent Application No. 2018-38776, filed on Mar. 5, 2018, the entire contents of which are incorporated herein by reference.

FIELD

The embodiments discussed herein are related to a program, a method, and a computing unit for computing an index on sediment disasters.

BACKGROUND

In the field of sediment disaster, an index of how much similar rainfall was experienced in the past is calculated using short rainfall (short-term in several minutes to several hours) and long rainfall (long-term in several days to several weeks), and it is determined whether disaster may occur at the time of rainfall based on the computed index and the past disasters. An example of the index is an output value (an RBFN output value) obtained via a radial basis function network (RBFN) which is a neural network.

There is a known technique in the art for computing the probability of occurrence of disaster by obtaining a function for computing the probability of occurrence of disaster from the RBFN output value by a regression analysis and reading the obtained function and observation data obtained for each disaster occurrence factor. Examples include Japanese Laid-open Patent Publication No. 2004-003274, No. 2010-197185, No. 2010-271877, No. 2004-346653, and No. 2015-232537.

Sediment disaster is predicted based on, for example, the accumulated rainfall up to the present and past observation data. However, an increase in accumulated rainfall due to unexpected continuing rainfall and unexpected immediately following heavy rain may cause the accumulated rainfall to exceed a disaster critical line (CL). For this reason, the probability of exceeding the CL after a unit time (hereinafter referred to as "excess probability") may be obtained in advance.

The above techniques take no account of the probability of unexpected continuing rainfall and unexpected immediately following heavy rain, so that the same RBFN value indicates the same disaster occurrence probability, that is, the same excess probability.

In one aspect, the influence of a precipitation zone is appropriately reflected to the probability of exceeding a critical line on the occurrence of disaster.

SUMMARY

According to an aspect of the embodiments, a method for computing an index on a sediment disaster, performed by a computer, the method includes: creating a computation model for computing the index on a sediment disaster at a specific point using information on a geometry of a precipitation zone at the specific point and long rainfall and short rainfall at the specific point, the information being created from past precipitation data accumulated in a storage unit; and computing the index on a sediment disaster using the computation model from the information on the geometry of the precipitation zone at the specific point, the information being created from the input precipitation data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 8A and 8B are diagrams for illustrating the relationship between the geometry of the precipitation zone and the continuity of rainfall;

DESCRIPTION OF EMBODIMENTS

Figure 1:
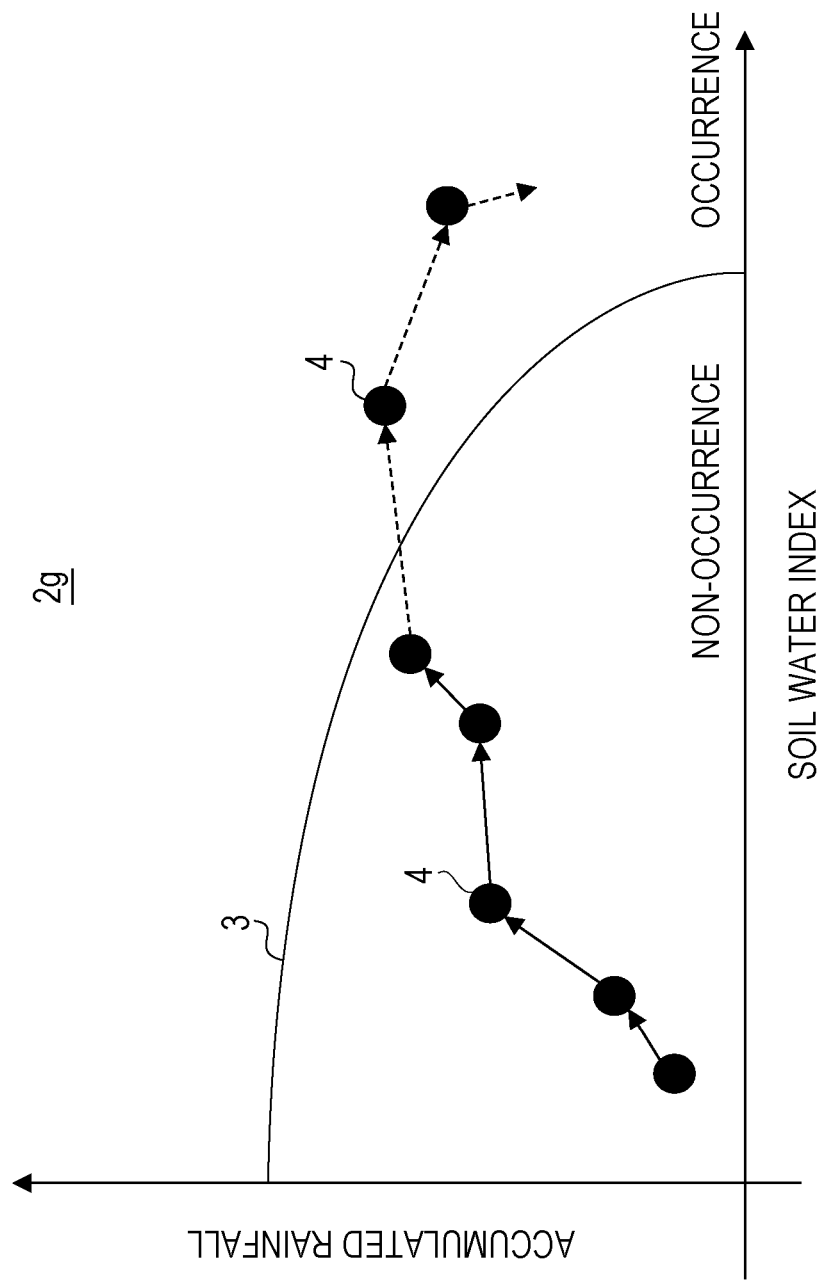
FIG. 1 is a graph illustrating determination of whether sediment disaster may occur using a critical line.

Embodiments of the present disclosure will be described hereinbelow with reference to the drawings. First, common sediment disaster prediction will be described. FIG. 1 is a graph illustrating determination of whether sediment disaster may occur using a critical line.

A decision diagram 2g in FIG. 1 for determining whether sediment disaster may occur is a graph illustrating soil water index on the horizontal axis and accumulated rainfall on the vertical axis. The decision diagram 2g illustrates a critical line (CL) 3 computed in advance and points 4 indicating the accumulated rainfall and the soil water index computed using observation data (rainfall) at past predetermined time intervals (every hour or the like).

The soil water index indicates the amount of moisture accumulated in the soil due to rainfall and is referred to as an index indicating sediment disaster risk. An example of the accumulated rainfall is a 60 minutes accumulated rainfall (mm/60 min). The accumulated rainfall is a value obtained by accumulating 10 minutes precipitation data obtained at a rainfall observation station for 60 minutes. At the plotted points 4, changes in measured value are indicated by solid arrows, and changes in predicted value are indicated by dotted arrows.

The area enclosed by the CL 3, the vertical axis, and the horizontal axis is a non-occurrence area where sediment disaster is less likely to occur. The area above the non-occurrence area corresponds to an occurrence area where sediment disaster is likely to occur. By referring to such a decision diagram 2g, it is determined that sediment disaster is likely to occur when the predicted value reaches the occurrence area exceeding the CL 3.

Figure 2:
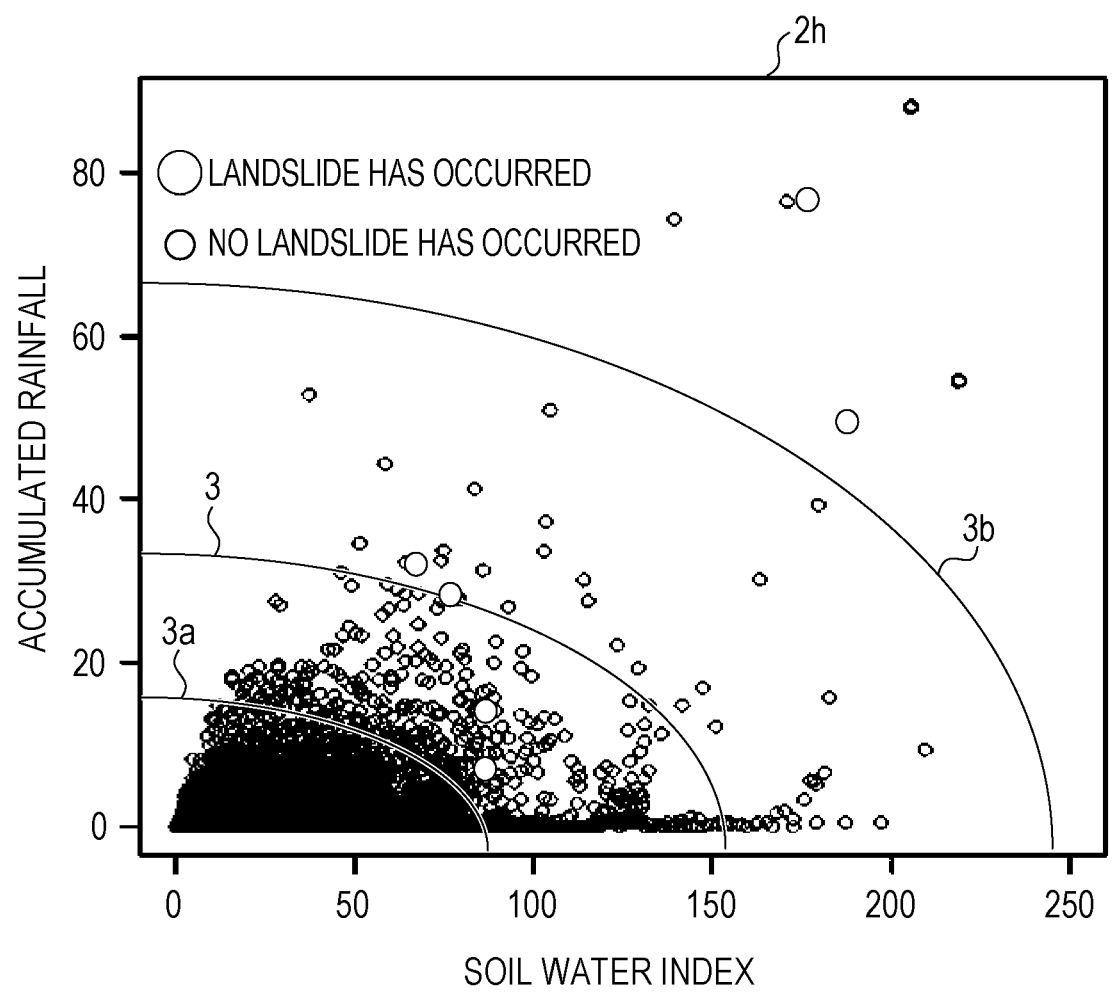
FIG. 2 is a graph illustrating critical lines.

FIG. 2 is a graph illustrating critical lines. A decision diagram 2h illustrated in FIG. 2 is a graph in which values are plotted based on past observation data. Referring to the decision diagram 2h, the critical line and the occurrence/non-occurrence of landslides, which is an example of sediment disaster, will be described.

The CL 3 illustrated in the decision diagram 2h is a critical line that is appropriately set based on measured values at the occurrence of past landslides and measured values at the non-occurrence of landslides. The large circles indicate points at which landslides occurred after the next unit time, and the small circles indicate points at which no landslide occurred after the next unit time.

In the area between the CL 3 and a CL 3a set in the non-occurrence area, many values are present, but the number of actual landslides is only two. If the CL 3a is set, it is predicted for the values at which no landslide actually occurs that sediment disasters may occur, so that many predictions result in failure (the predictions fail).

In the area between the CL 3 and a CL 3b set in the occurrence area, less values are included than the values in the area between the CL 3 and the CL 3a, but two landslides occurred actually. If the CL 3b is set, the two landslides that could be predicted using the CL 3 are missed. Compared to the CL 3, there is a high possibility of missing the occurrence of landslides.

Figure 3:
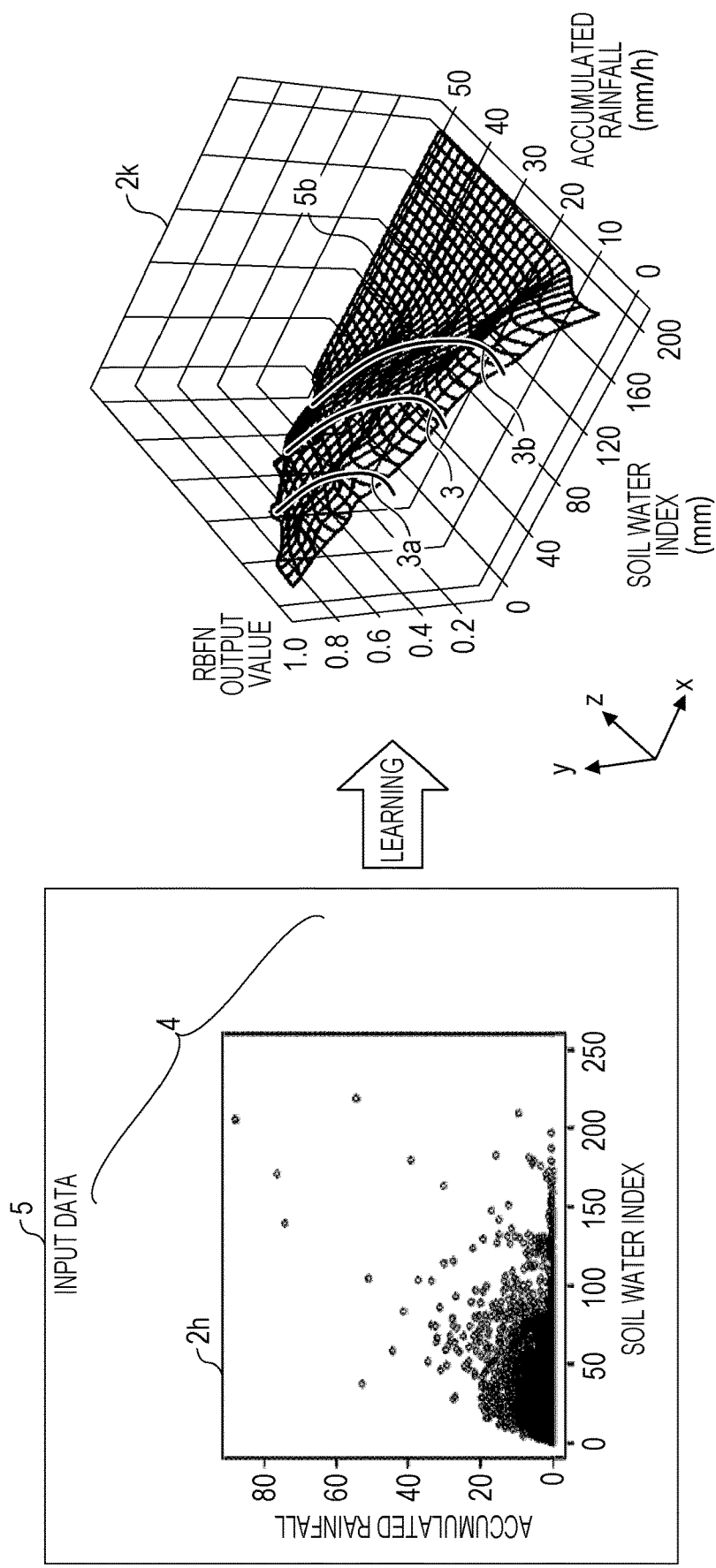
FIG. 3 is a diagram for illustrating, in outline, a method for creating the critical line.

FIG. 3 is a diagram for illustrating, in outline, a method for creating a critical line CL. In FIG. 3, a response curved surface 5b is created by learning the occurrence and non-occurrence of landslides using past data 4 on accumulated rainfall and soil water indices as input data 5. The response curved surface 5b is represented by the accumulated rainfall and soil water indices in the past data 4 and the output values of the radial basis function network (RBFN) (RBFN output values). Portions where no observation value is present are interpolated using the response curved surface 5b to define a critical line.

The response curved surface 5b is a three-dimensional curved surface represented by a graph 2k illustrating the soil water index on the x-axis, the RBFN output value on the y-axis, and the accumulated rainfall on the z-axis and created based on a frequency distribution of long periods of non-occurrence rainfall.

The RBFN is a technique for modeling the brain and neural network and computing human evaluation using a computer. The RBFN learns the relationship between the input and output from past data and outputs a value evaluating whether landslides may occur. As the RBFN output value approaches 1, landslides are less likely to occur, and as the RBFN output value approaches 0, landslides are likely to occur.

The response curved surface 5b is formed for each target point, such as a municipality (a precipitation station), using the RBFN to determine the CL 3. In the learning phase using the RBFN, it is determined that areas where rain frequency is high in the past have low risk. In this example, the CL 3a and the CL 3b illustrated in FIG. 2 are also illustrated for reference. On the response curved surface 5b, the CL 3a is illustrated close to a RBFN output value of 1 with respect to the CL 3, and the CL 3b is illustrated close to a RBFN output value of 0 with respect to the CL 3.

Figure 4:
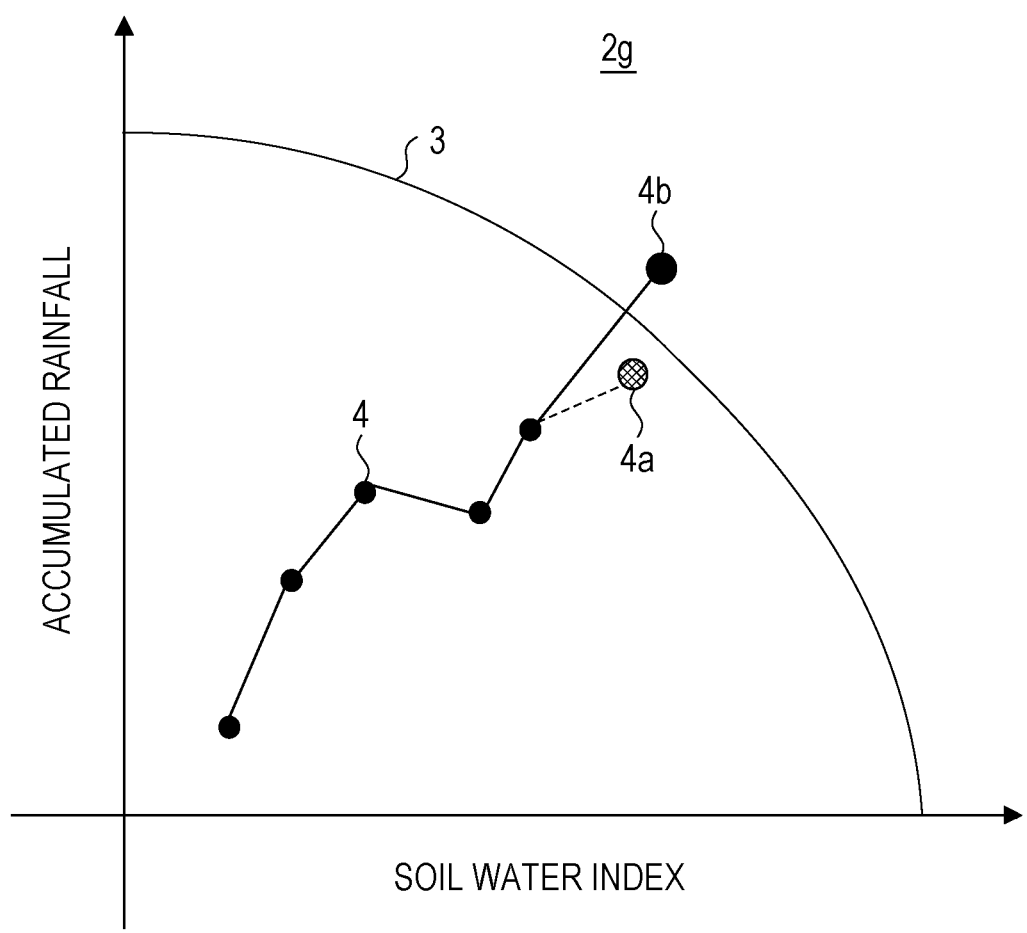
FIG. 4 is a graph illustrating an example of a decision diagram in the case of more than expected rainfall.

FIG. 4 is a graph illustrating an example of a decision diagram in the case of more than expected rainfall. The decision on whether landslides may occur using the critical line is made based on expected rainfall, but actual rainfall may exceed expectations.

In FIG. 4, a point 4a close to the CL 3 is plotted in the non-occurrence area from the accumulated rainfall and the soil water index obtained based on a predicted rainfall for the next unit time. However, in the actual next unit time, a point 4b is plotted in the occurrence area across the CL 3 from the accumulated rainfall and the soil water index based on an actually measured rainfall.

The municipality at the target point normally takes different measures depending on whether the rainfall exceeds the CL 3. If the excess over the CL 3 has not been predicted, the municipality may not contact the residents and prepare for disasters in advance. At least when the rainfall is close to the CL 3, it is important for the municipality or the like to know in advance how much possibility that the rainfall exceeds the CL 3. For that purpose, Laid-open Patent Publication No. 2010-271877 proposes a technique for computing CL excess probability that the rainfall exceeds the CL 3 determined for each municipality into the disaster occurrence area and illustrating the excess probability in the decision diagram 2g.

Figure 5:
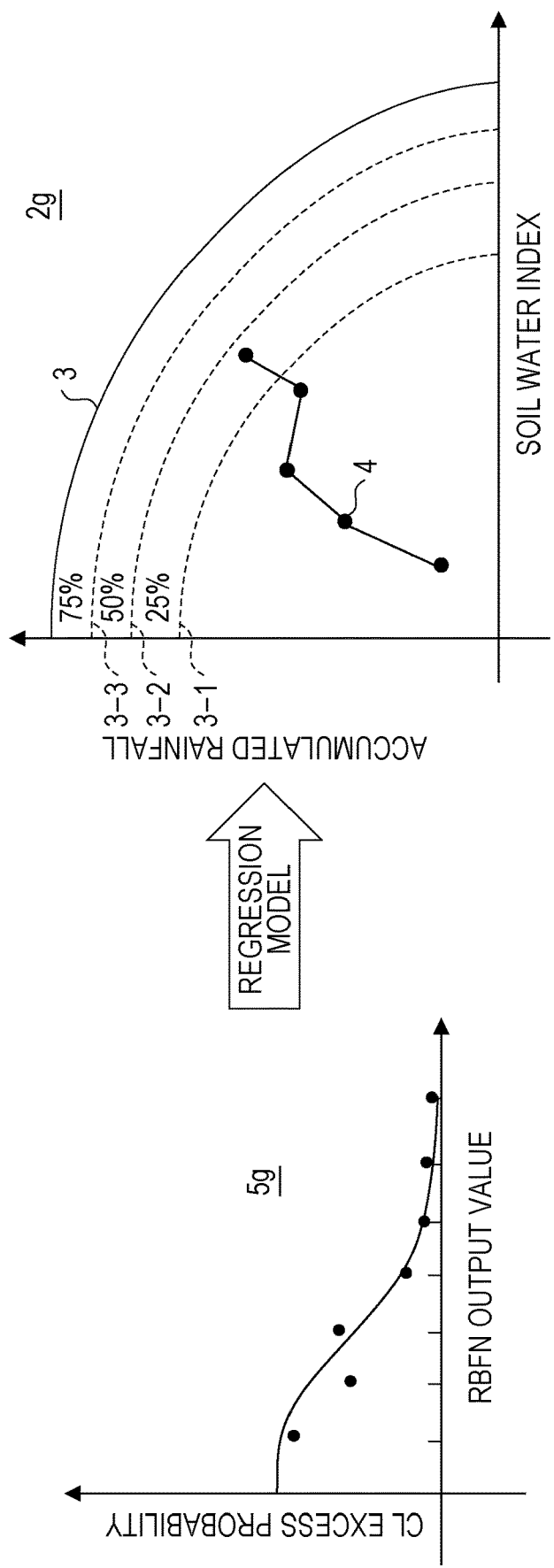
FIG. 5 illustrates a known method for obtaining CL excess probability.

FIG. 5 illustrates a known method for obtaining CL excess probability. A graph 5g of FIG. 5 illustrates RBFN output value obtained by learning the past data 4 on the horizontal axis and CL excess probability on the vertical axis. In one example, the probability that the RBFN output value exceeds the CL after a unit time (CL excess probability) is calculated at the point in time the RBFN output value does not exceed the CL. For example, there are ten points in the past where the RBFN output value is 0.8, and when three of the ten points exceed the CL after the next unit time, the CL excess probability is 30%.

A regression model for obtaining CL excess probability for each RBFN output value is created. CL excess probability lines at which the CL excess probability is 25%, 50%, and 75% are obtained from the regression model. The CL excess probability is not limited to these values. The user, such as a municipality, may designate desired CL excess probability for reference.

The graph 2g in FIG. 5 illustrates respective CL excess probability lines 3-1, 3-2, and 3-3 of 25%, 50%, and 75% obtained from the regression model as dotted lines, thereby making it easy to understand the necessity of preparation for disasters.

The known technique described above allows the user to find the probability of exceeding the CL 3 in advance. However, this known technique statistically determines whether the RBFN value exceeds the CL 3 by performing a regression analysis using a RBFN output value immediately before the rainfall exceeds the CL 3. Since the CL excess probability is computed only using the RBFN output value, the rainfall trend, such as whether the rain continues falling or stops, is not taken into consideration even with the same RBFN output value. Accordingly, even with different rainfall trends, the CL excess probability after the next unit time is unique if the RBFN value is the same.

The inventor has devised to obtain CL excess probability after a unit time in consideration of a linear precipitation zone in view of the fact that the linear precipitation zone is involved in the likelihood of continuation of rainfall and the likelihood of heavy rain. The linear precipitation zone will be first described.

The linear precipitation zone is crowded with multiple cumulonimbus clouds to cause concentrated heavy rain. The scale is normally from 20 to 50 kilometers wide and from 50 to 200 kilometers long, and the ratio of the long axis to the horizontal axis is about 3 to 1, but there is no set definition. If the linear precipitation zone is formed, heavy rain occurs, making it easy to cause sediment disasters.

Figure 6:
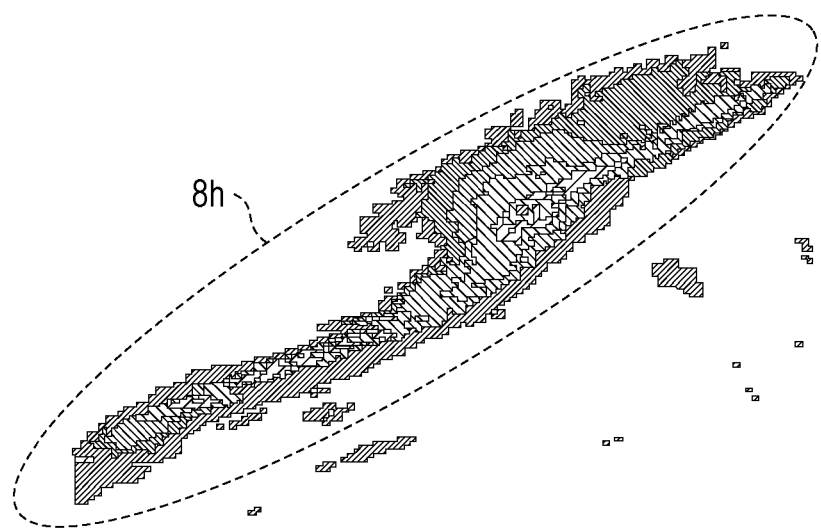
FIG. 6 is a diagram illustrating an example of a linear precipitation zone.

FIG. 6 is a diagram illustrating an example of the linear precipitation zone. In FIG. 6, a linear precipitation zone 8h is formed from a mass of multiple cumulonimbus clouds appearing near the front. Representative examples include three types: a squall line type, a back building type, and a back and side building type. It is known that the linear precipitation zone 8h stays at the same point to cause long rainfall or the like, causing sediment disasters with a high possibility.

For example, the CL excess probability after a unit time may differ (change) between when the linear precipitation zone 8h is formed and when the linear precipitation zone 8h is not formed. Accordingly, the present embodiment improves the accuracy of CL excess probability by updating the CL excess probability line in real time based on the value of the latest geometry of the precipitation zone observed.

Figure 7A:
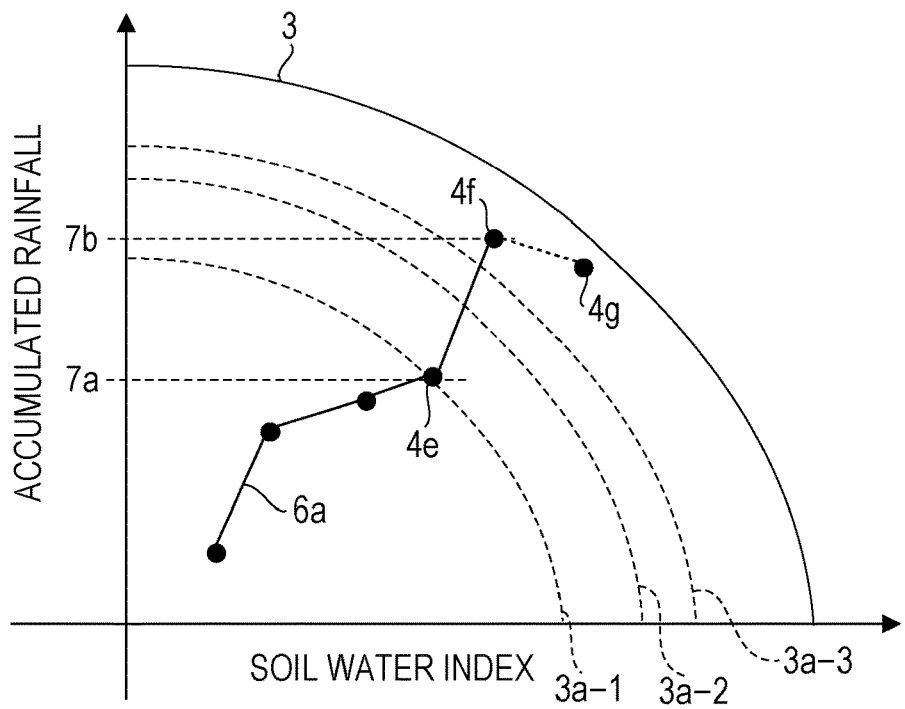
FIGS. 7A and 7B are graphs illustrating setting examples of a CL excess probability line.
Figure 7B:
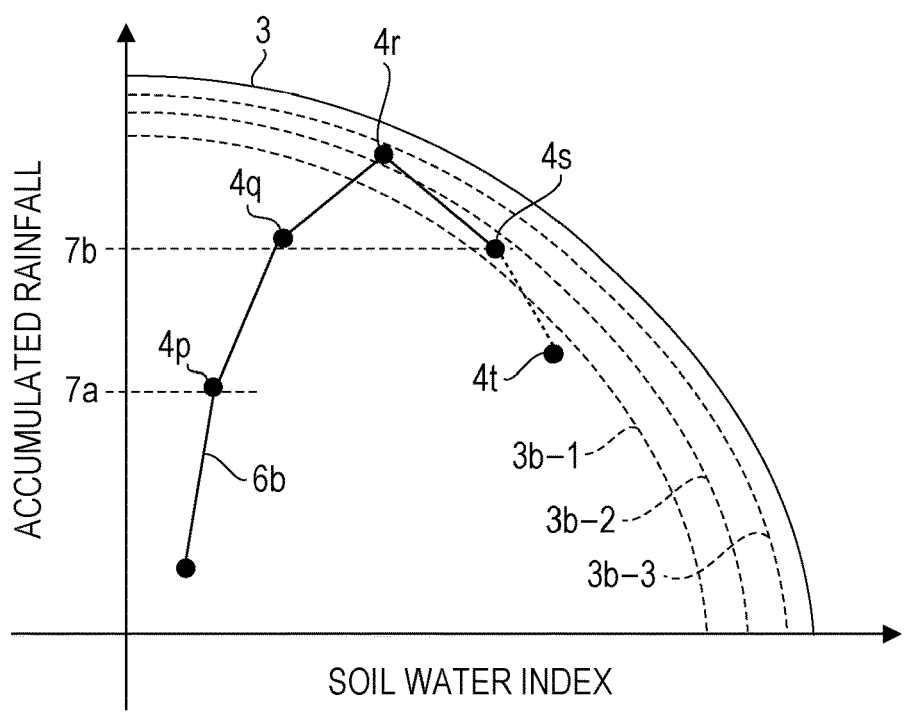

FIGS. 7A and 7B are graphs illustrating examples of setting of the CL excess probability lines in the present embodiment. FIG. 7A illustrates CL excess probability lines 3a-1, 3a-2, and 3a-3 in the case where the linear precipitation zone 8h is present. In the case where the linear precipitation zone 8h is present, heavy rain tends to occur. For that reason, in the present embodiment, the CL excess probability lines 3a-1, 3a-2, and 3a-3 are set lower in the non-occurrence area. The CL excess probability lines 3a-1, 3a-2, and 3a-3 are set away from the CL 3.

FIG. 7B illustrates CL excess probability lines 3b-1, 3b-2, and 3b-3 in the case where the linear precipitation zone 8h is not present. In the case where the linear precipitation zone 8h is not present, heavy rain is less likely to occur. For that reason, in the present embodiment, the CL excess probability lines 3b-1, 3b-2, and 3b-3 are set higher in the non-occurrence area. The CL excess probability lines 3b-1, 3b-2, and 3b-3 are set close to the CL 3.

In the case of a pattern 6a in FIG. 7A illustrating the transition of accumulated rainfall, the accumulated rainfall exceeds the CL excess probability line 3a-1 when the value at a point 4e reaches an accumulated rainfall 7a. This allows the municipality or the like to recognize that the rainfall may exceed the CL 3 with a probability of 25% after the next unit time when the value at the point 4e is obtained. At a point 4f after the next unit time, the value does not exceed the CL 3, but the point 4f is positioned above the CL excess probability line 3a-3, so that the value may exceed the CL 3 after the next unit time with a probability of 75% or higher.

Under such circumstances, a predicted point 4g is above the CL excess probability line 3a-3 after the next unit time even below the CL 3. This allows the municipality or the like to recognize that sufficient precaution has to be taken.

In contrast, in the case of a pattern 6b in FIG. 7B illustrating transition of accumulated rainfall, a point 4p with the same accumulated rainfall 7a as in FIG. 7A is lower than the CL excess probability line 3b-1. A point 4q after the unit time next to the point 4p is above the same accumulated rainfall 7b as in FIG. 7A but is lower than the CL excess probability line 3b-1. Thus, it may be determined that there is little probability of exceeding the CL 3 at both of the point 4p and the point 4q.

A point 4r after the next unit time is positioned between the CL excess probability lines 3b-2 and 3b-3. Therefore, there is a probability of 50% or higher and 75% or lower that the rainfall exceeds the CL 3. After the next unit time, a point 4s is presented between the CL excess probability lines 3b-1 and 3b-2. The accumulated rainfall at the point 4s is substantially the same as the accumulated rainfall at the point 4q, but the soil water index is higher than the soil water index at the point 4q, so that the point 4s is positioned over the CL excess probability line 3b-1.

The predicted point after the unit time next to the point 4s is a point 4t. The point 4t is lower than the CL excess probability line 3b-1, but the point 4s above the CL excess probability line 3b-1 allows easy recognition of the probability of sediment disasters at 25% or more and 50% or less, thus allowing preparation for sediment disasters.

If a comparison is made between the pattern 6a in FIG. 7A and the pattern 6b in FIG. 7B, the accumulated rainfall of the pattern 6a gradually increases, but the probability of sediment disasters is found out when the rainfall reaches the accumulated rainfall 7a. For the pattern 6b in the case where the linear precipitation zone 8h is not formed, even if the accumulated rainfall increases in the early phase, the probability of sediment disasters is low even when the rainfall reaches the accumulated rainfall 7b over the accumulated rainfall 7a.

In the present embodiment, in the case where the linear precipitation zone 8h is formed, heavy rain is likely to occur, as illustrated in FIG. 7A, so that the CL excess probability is increased and varied in consideration of the influence of the heavy rain. That is, the CL excess probability is computed with higher accuracy. For example, geometry parameter representing the geometry of the linear precipitation zone 8h is created, and CL excess probability is obtained using the created geometry parameter and the RBFN output values.

Since the definition of the linear precipitation zone 8h has not been established yet, it is simply referred to as "precipitation zone", and is explained in the following description.

First, the relationship between the geometry of the precipitation zone and the continuity of rainfall will be described with reference to FIGS. 8A and 8B. In FIGS. 8A and 8B, precipitation zones 8a and 8b are formed along a front 8f and the flow of wind into an elongate shape, whose size may be approximately represented by the long side and the short side. Simply, the longer the long side, the wider area is given rainfall, and the longer the short side, the longer the rainfall lasts.

In this example, a target point or geographical location 9p, such as a municipality, illustrated in FIGS. 8A and 8B represents the same point, and the precipitation zones 8a and 8b move in the same traveling direction 8e at the same speed. The difference in continuity of the rainfall according to the difference between the lengths of the short sides of the precipitation zones 8a and 8b, with the long sides set at the same, will be described in outline.

The precipitation zone 8a in FIG. 8A is smaller in short side than the precipitation zone 8b in the FIG. 8B. The target point 9p is exposed to rain for a moving distance 8p after entering the precipitation zone 8a until coming out of the precipitation zone 8a.

The precipitation zone 8b in FIG. 8B is larger in short side than the precipitation zone 8a in FIG. 8A. Accordingly, the target point 9p is exposed to rain for a moving distance 8q after entering the precipitation zone 8b until coming out of the precipitation zone 8b, which is longer than the case of the precipitation zone 8a, thereby providing a longer rainfall than the case of the precipitation zone 8a.

Thus, it is posited that the probability of the occurrence of sediment disaster depends on the geometry of the precipitation zone and a method is found for computing CL excess probability using geometry parameter representing information on the geometry of the precipitation zone (hereinafter referred to as "geometry parameter").

Figure 9:
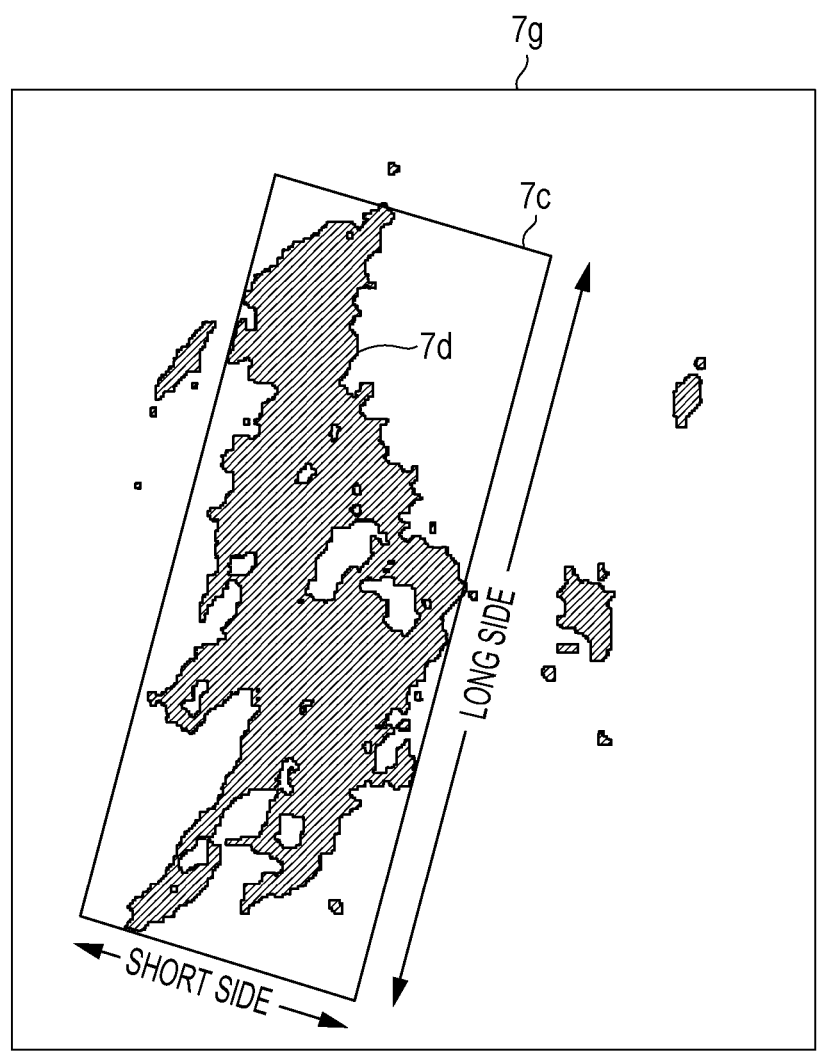
FIG. 9 is a diagram illustrating an example of a rainfall distribution image in the sky.

First, the geometry parameter will be described. FIG. 9 is a diagram illustrating an example of a rainfall distribution image in the sky. In FIG. 9, a rainfall that may have low influence on sediment disasters is predetermined as a threshold so that weak rain areas are not detected, and a distribution of rainfalls higher than or equal to a fixed strength is created. An example of the fixed strength is 50 mm/3 h.

In a rainfall distribution image 7g illustrated in FIG. 9, a minimum circumscribed rectangle 7c enclosing a continuous detected area 7d is obtained. The following information is acquired from the obtained circumscribed rectangle 7c. The information is generically referred to as geometry parameter. The obtained parameter includes:

The ratio of the long side to the short side (aspect ratio)
Area
The long side of the circumscribed rectangle
The short side of the circumscribed rectangle.

The target data from which the geometry parameter is to be obtained may be any of the following data.

Data on target time (target time: the latest value at the time of execution, the individual times at the time of learning)
Prediction data (30 minutes after the target time, for example, one hour later)
Past data (30 minutes before the target time, for example, one hour ago)
Time-series change data (for example, the difference between n minutes before the target time and the target time)

Figure 10A:
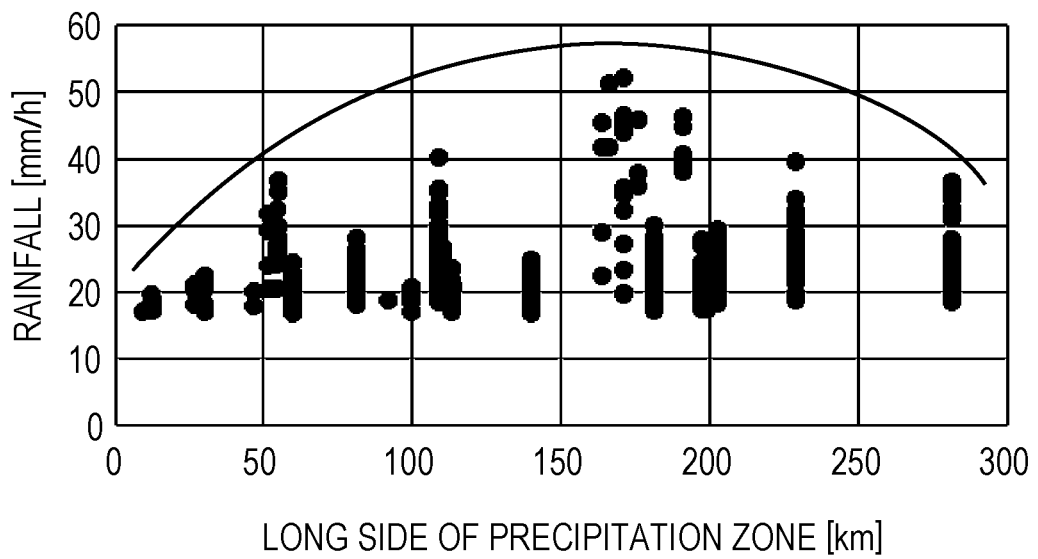
FIG. 10A is a graph illustrating the relationship between the long side of the precipitation zone and the rainfall.
Figure 10B:
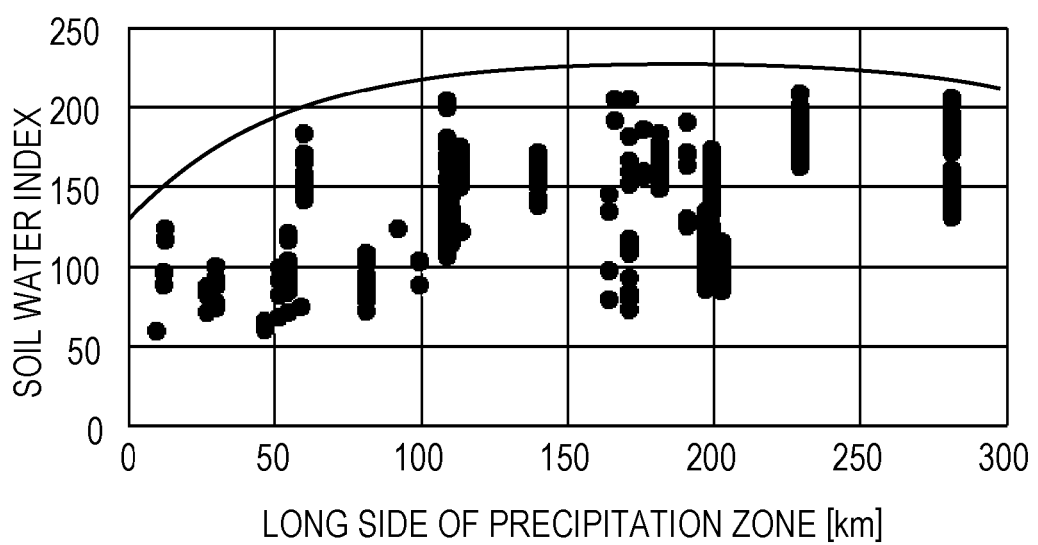
FIG. 10B is a graph illustrating the relationship between the long side of the precipitation zone and the soil water index.

How the geometry parameter obtained as described above is to be used will be described. Referring to FIGS. 10A and 10B, the respective relationships between the geometry of the precipitation zone and the rainfall and the soil water index will be described. FIGS. 10A and 10B respectively illustrate the rainfall and the soil water index in a municipality in a precipitation zone with accumulated rainfall equal to or higher than 50 mm/3 h.

The graph in FIG. 10A illustrates the relationship between the long side of the precipitation zone and the rainfall. The graph in FIG. 10B illustrates the relationship between the long side of the precipitation zone and the soil water index. Both the rainfall and the soil water index in the graphs exhibit low relationship. For example, using the long side of the precipitation zone to correct the value of precipitation may not improve the accuracy because of the low relationship.

However, it is found that if the geometry parameter is used in addition to the RBFN output values to determine the CL excess probability, there is a relationship between the RBFN output values and the geometry parameter. An approximate curve model to determine the CL excess probability is derived as $$\text{Approximate curve} = \frac{1}{1 + \exp(f(x, y))}, \quad [\text{Eq. 1}]$$

$$f(x, y) = ax + by + c$$

In Eq. 1, x is RBFN output value, and y is a geometry parameter. "a", "b" and "c" are coefficients.

Figure 11:
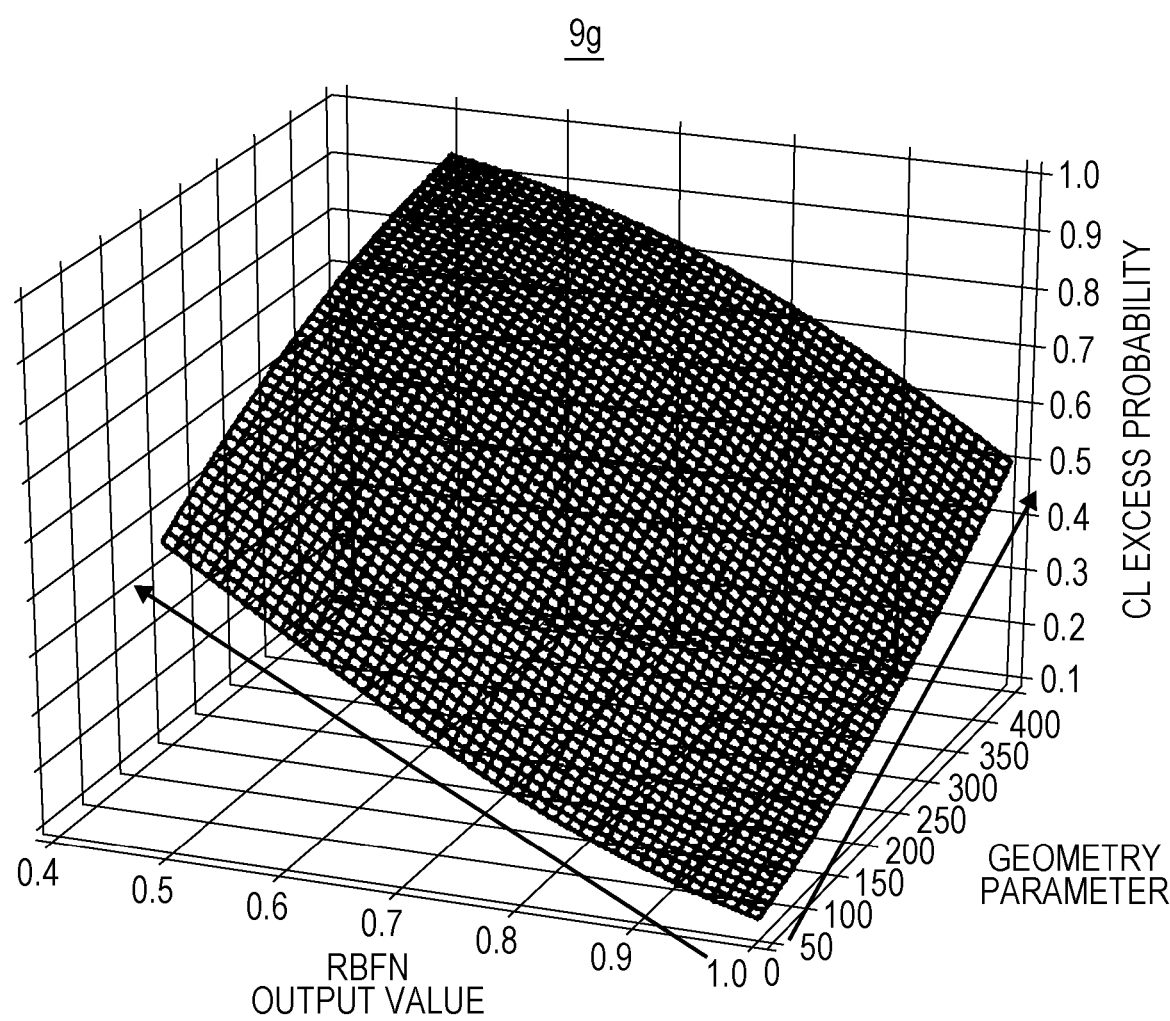
FIG. 11 is a graph illustrating an example of the computation result of CL excess probability.

FIG. 11 is a graph illustrating an example of the computation result of CL excess probability. In FIG. 11, a graph 9g illustrates the RBFN output value on the x-axis, the CL excess probability on the y-axis, and the geometry parameter on the z-axis. The geometry parameter includes four parameters, as described above and is represented in multiple dimensions. In this example, the long side is illustrated as an example.

In the graph 9g in FIG. 11, the CL excess probability increases as the RBFN output value decreases and the long side increases. Thus using Eq. 1 allows correcting the CL excess probability according to the geometry of the precipitation zone using the geometry parameter.

Figure 12:
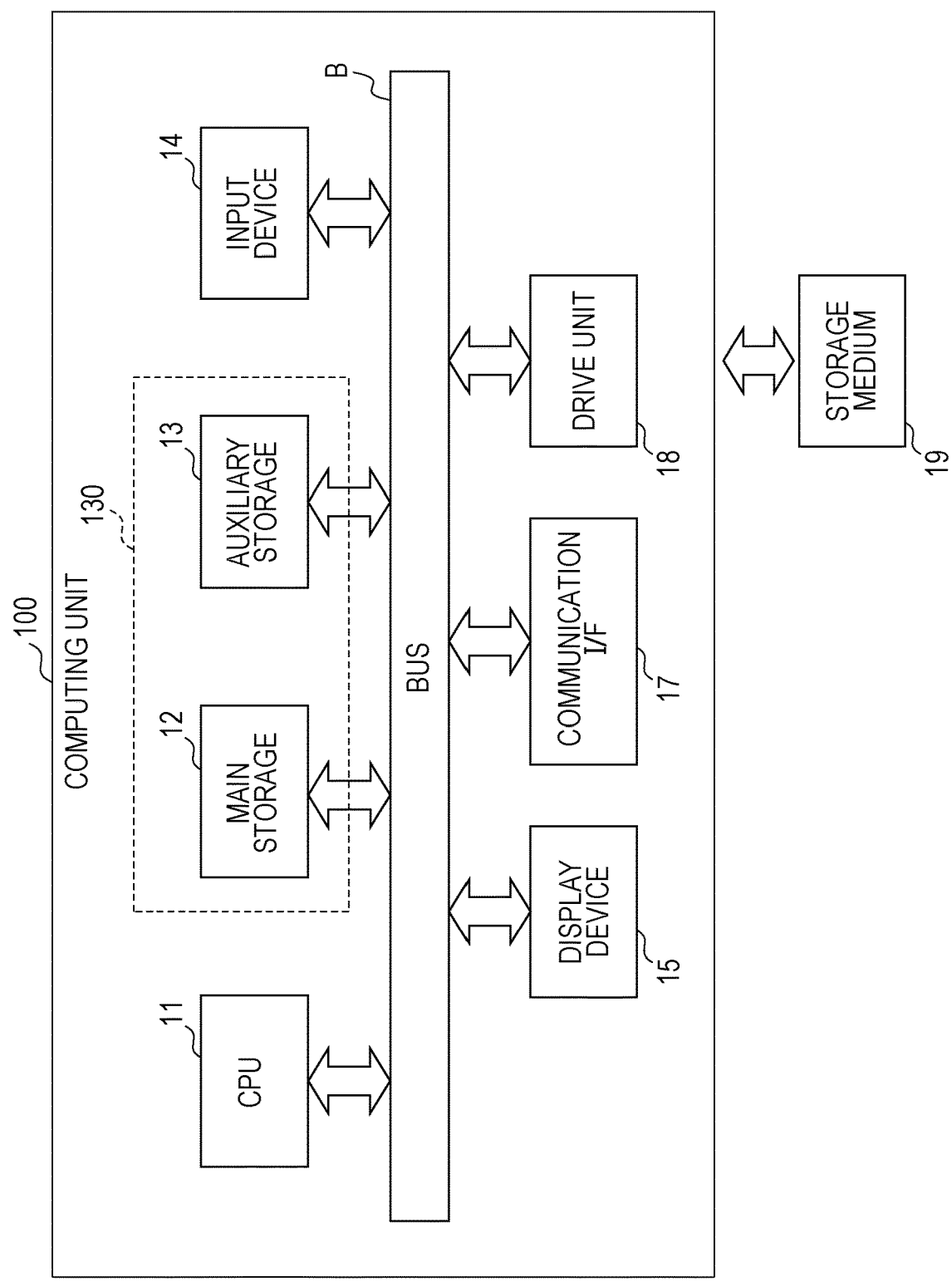
FIG. 12 is a diagram illustrating the hardware configuration of a computing unit.

A computing unit that implements the above embodiment has the hardware configuration illustrated in FIG. 12. FIG. 12 illustrates the hardware configuration of the computing unit. In FIG. 12, the computing unit 100 is an information processing apparatus controlled by a computer and includes a central processing unit (CPU) 11, a main storage 12, an auxiliary storage 13, an input device 14, a display device 15, a communication interface (I/F) 17, and a drive unit 18, which are connected via a bus B.

The CPU 11 corresponds to a processor that controls the computing unit 100 according to programs stored in the main storage 12. The main storage 12 includes a random access memory (RAM) and a read only memory (ROM), and stores or temporarily stores the programs to be executed by the CPU 11 and data for use in processing in the CPU 11 and data obtained by the processing in the CPU 11.

An example of the auxiliary storage 13 is a hard disk drive (HDD). The auxiliary storage 13 stores data, such as programs for executing various processes. Part of the programs stored in the auxiliary storage 13 are loaded to the main storage 12 and executed by the CPU 11, so that the various processes are implemented. The main storage 12, the auxiliary storage 13, and an external storage that may be accessed by the computing unit 100 are collectively referred to as a storage unit 130.

The input device 14 includes a mouse, a keyboard, and so on, and is used for the user to input various pieces of information for processing performed by the computing unit 100. The display device 15 displays various pieces of information under the control of the CPU 11. The input device 14 and the display device 15 may be a user interface, for example, an integrated touch panel. The communication I/F 17 performs communication via a wired or wireless network. The communication via the communication I/F 17 is not limited to the wired or wireless communication.

The drive unit 18 interfaces a storage medium 19 (for example, a compact disc read-only memory [CD-ROM]) set in the drive unit 18 and the computing unit 100 with each other.

The programs for implementing processing to be performed by the computing unit 100 are provided to the computing unit 100 using the storage medium 19, such as a CD-ROM. The storage medium 19 stores programs for implementing various processes according to the present embodiment, to be described later. The programs stored in the storage medium 19 are installed in the computing unit 100 via the drive unit 18. The installed programs are executed by the computing unit 100.

The storage medium 19 storing the programs is not limited to the CD-ROM but may be one or more computer-readable non-transitory, tangible media with a structure. The computer-readable storage media may include portable recording media, such as a digital versatile disk (DVD) and a universal serial bus (USB) memory, and a semiconductor memory, such as a flash memory.

Figure 13:
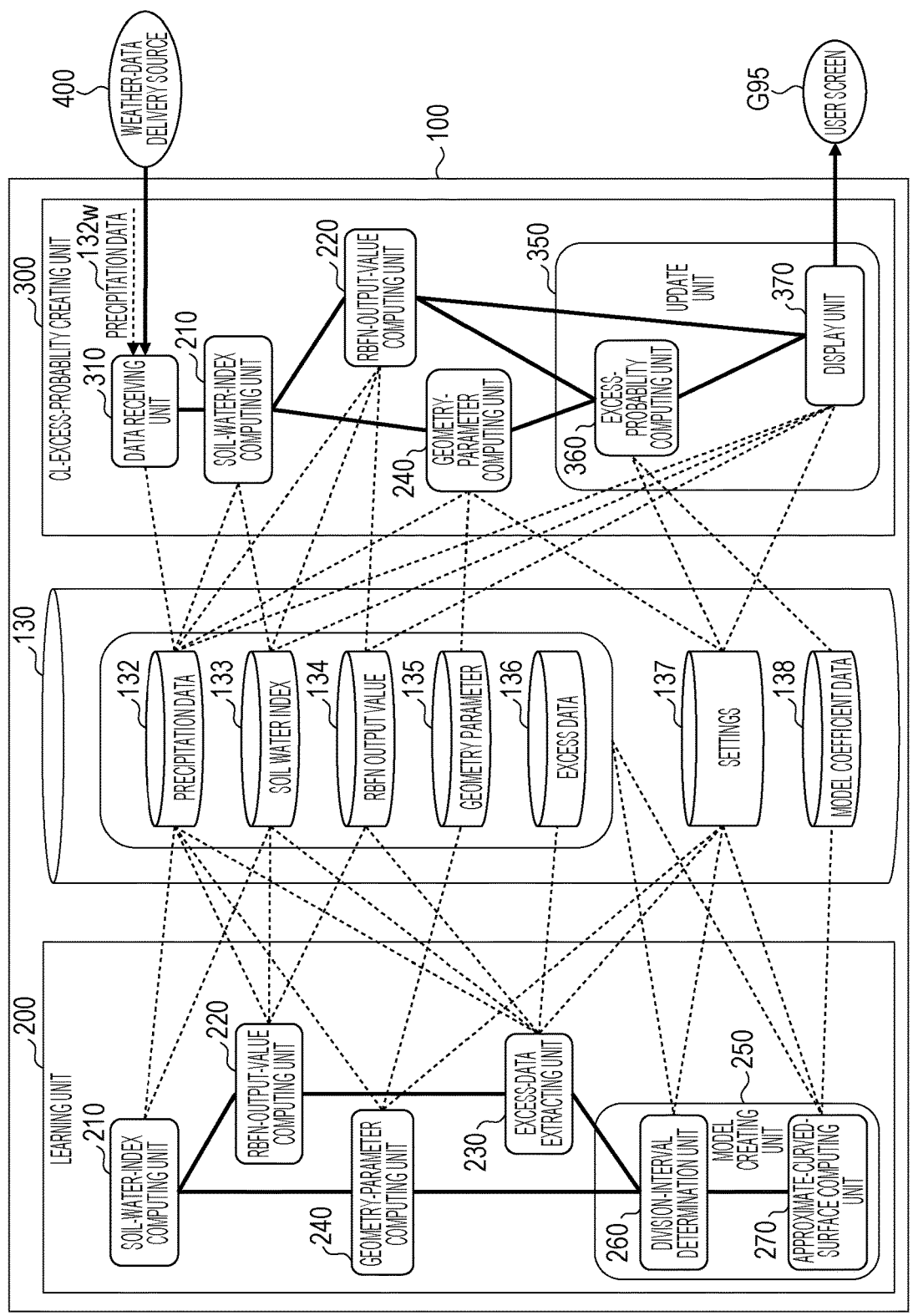
FIG. 13 is a diagram illustrating an example of the functional configuration of the computing unit.

FIG. 13 is a diagram illustrating an example of the functional configuration of the computing unit 100. In FIG. 13, the computing unit 100 mainly includes a learning unit 200 and a CL-excess-probability-line creating unit 300 for processing. The learning unit 200 and the CL-excess-probability-line creating unit 300 are implemented by the programs installed in the computing unit 100 causing the CPU 11 of the computing unit 100 to execute. In FIG. 13, the solid lines indicate the relationship between the processing units, and the broken lines indicate the relationship between the processing units and data.

The storage unit 130 stores precipitation data 132, soil water indices 133, RBFN output values 134, geometry parameter 135, excess data 136, settings 137, model coefficient data 138, and so on.

The learning unit 200 is a processing unit for creating a model for computing CL excess probability. The learning unit 200 includes a soil-water-index computing unit 210, an RBFN-output-value computing unit 220, an excess-data extraction unit 230, a geometry-parameter computing unit 240, and a model creating unit 250.

The soil-water-index computing unit 210 is a processing unit for computing the soil water indices 133 for all past rainfalls with reference to all or part of the precipitation data 132. The computed soil water indices 133 are stored in the storage unit 130.

The RBFN-output-value computing unit 220 is a processing unit for computing the RBFN output values 134 with reference to all or part of the past precipitation data 132. Accumulated rainfall is calculated for each target past precipitation data 132. The RBFN output value 134 is computed from the soil water index and the accumulated rainfall in each precipitation data 132 and is stored in the storage unit 130. In the storage unit 130, the soil water index and the accumulated rainfall are associated with each RBFN output value 134.

The excess-data extraction unit 230 is a processing unit for extracting an RBFN output value 134 that exceeds the CL after a unit time from a non-excess state. An RBFN output value 134 that exceeds the CL after the next unit time is extracted as the excess data 136 from the RBFN output values 134 computed by the RBFN-output-value computing unit 220 using a CL threshold for the RBFN output values, which is indicated by the settings 137, and is stored in the storage unit 130.

The geometry-parameter computing unit 240 is a processing unit for computing four kinds of value on the geometry of the precipitation zone using a threshold for extracting the geometry, which is a threshold for the precipitation data 132, which is indicated by the settings 137. The geometry parameter 135 indicating the calculated four kinds of value is stored in the storage unit 130. The four kinds of value are The ratio of the long side to the short side Area The long side of the circumscribed rectangle The short side of the circumscribed rectangle.

The model creating unit 250 is a processing unit for determining the coefficients of the approximate curve model (Eq. 1) and includes a division-interval determination unit 260 and an approximate-curved-surface computing unit 270.

The division-interval determination unit 260 is a processing unit for determining the number of divisions of the geometry parameter 135 and the number of divisions of the RBFN output values 134. The number of divisions may be determined using Sturges' rule but is not limited to the Sturges' rule. Sturges' rule:

$$k = \log_2 N + 1 \quad \text{[Eq. 2]}$$

When Eq. 2 is used, the number of divisions, k, may be obtained by setting the number of pieces of the excess data 136 to n. The interval (division interval) of division by the number of divisions, k, is obtained by dividing the values from a minimum value to a maximum value by the number of divisions, k, for both of the geometry parameter 135 and the RBFN output value 134. For the geometry parameter 135, the number of divisions, k, is obtained for each of the four kinds of value.

The geometry parameter 135 and the RBFN output value 134 may be divided using the number of divisions, k, set in the settings 137 in advance. The number of divisions, k, Sturges' rule, or another rule may be set in the settings 137 so that the division-interval determination unit 260 may obtain the division interval using the number of divisions determined for processing corresponding to the settings 137.

The approximate-curved-surface computing unit 270 is a processing unit for computing an approximate curved surface representing the CL excess probability. First, the approximate-curved-surface computing unit 270 computes a CL excess probability for each of grids formed by the number of divisions, k, in multiple dimensions formed from the geometry parameter 135 (four dimensions), the RBFN output values 134, and the CL excess probability. The CL excess probability at each grid may be obtained by $$\frac{\text{Number of } CL \text{ excess data}}{\text{Number of total precipitation data}} \quad \text{[Eq. 3]}$$

The approximate-curved-surface computing unit 270 computes the approximate curved surface using the CL excess probability at each grid. The settings 137 include the approximate curve model (Eq. 1). The approximate-curvedsurface computing unit 270 determines coefficients a, b, and c with which the approximate curve model (Eq. 1) most approximates the CL excess probability at each grid. The model coefficient data 138 indicating the obtained coefficients a, b, and c is stored in the storage unit 130.

The settings 137 include:
A threshold for extracting the geometry
A threshold for CL
The number of divisions (a numerical value or an equation)
Approximate curve model (an equation)
Display interval of probability line (for example, 25% intervals).

In the above learning processing, the learning unit 200 obtains the precipitation data 132 in advance at the first learning. At the second learning from then on, computations of the soil water index 133, the RBFN output value 134, and the geometry parameter 135 may be performed only for the uncomputed portion of the precipitation data 132.

The CL-excess-probability-line creating unit 300 is a processing unit for creating a CL excess probability line corresponding to the latest rainfall situation using the approximate curve model (Eq. 1) created by the learning unit 200 and includes a data receiving unit 310, a soil-water-index computing unit 210, an RBFN-output-value computing unit 220, a geometry-parameter computing unit 240, and an update unit 350 for processing. The processing units in the CL-excess-probability-line creating unit 300 similar to the processing units in the learning unit 200 are given the same reference numbers, and detailed descriptions will be omitted.

The data receiving unit 310 is a processing unit for receiving precipitation data 132w from a weather-data distribution source 400 in events at predetermined intervals and accumulates the precipitation data 132w in the storage unit 130. The decision diagram 2g using the soil water indices and the RBFN output values obtained by using the precipitation data 132w is created by the soil-water-index computing unit 210 and the RBFN-output-value computing unit 220 and is displayed on a user screen G95 of the display device 15.

The update unit 350 is a processing unit for updating the CL excess probability line displayed on the decision diagram 2g and includes an excess-probability computing unit 360 and a display unit 370. The excess-probability computing unit 360 is a processing unit for computing a cross-sectional expression using the geometry parameter 135 of the precipitation zone based on the precipitation data 132w in the approximate curve model (Eq. 2) obtained from the settings 137 and the model coefficient data 138 by the geometry-parameter computing unit 240.

The display unit 370 is a processing unit for computing CL excess probability lines based on the probability-line display intervals specified by the settings 137 using the cross-sectional expression computed by the excess-probability computing unit 360. The computed CL excess probability lines are displayed on the decision diagram 2g on the user screen G95 to update the decision diagram 2g. In one example, CL excess probability lines of 25%, 50%, and 75% are displayed on the decision diagram 2g.

In the present embodiment, the CL excess probability lines are updated based on the latest precipitation data 132w. This allows the user to determine whether the rainfall exceeds the CL 3 according to changes in rainfall situation. The learning processing performed by the learning unit 200 will be described with reference to FIGS. 14 to 16, and the CL-excess-probability-line creation processing performed by the CL-excess-probability-line creating unit 300 will be described with reference to FIGS. 17 and 18.

Figure 14:
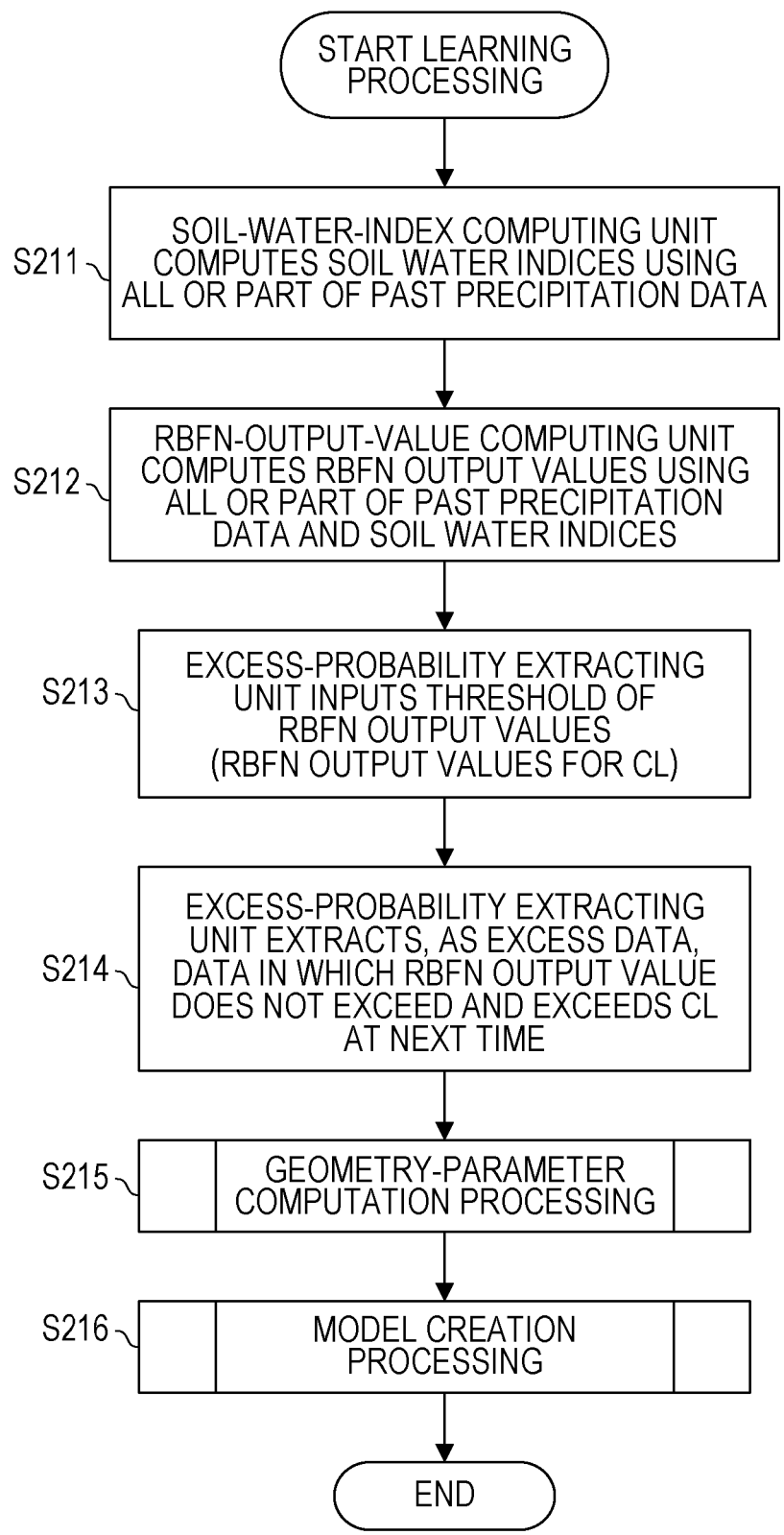
FIG. 14 is a flowchart for illustrating learning processing performed by a learning unit.

FIG. 14 is a flowchart for illustrating the learning processing performed by the learning unit 200. Referring to FIG. 14, in the learning unit 200, first, the soil-water-index computing unit 210 computes the soil water indices using all or part of the past precipitation data 132 (step S211), and the RBFN-output-value computing unit 220 computes the RBFN output values using all or part of the past precipitation data 132 and soil water indices 133 (step S212).

The excess-data extraction unit 230 inputs a threshold of the RBFN values (step S213). The threshold is an RBFN output value for the CL 3. When the threshold of the RBFN is input, the excess-data extraction unit 230 extracts data in which the RBFN output value does not exceed the CL 3 and exceeds the CL 3 at the next time as the excess data 136 (step S214).

Next, the geometry-parameter computing unit 240 performs geometry parameter computation processing for specifying a precipitation zone whose rainfall is equal to or higher than the geometry extraction threshold of the settings 137 from the precipitation data 132 and computing the geometry parameter 135 from the geometry of the specified precipitation zone (step S215). The computed geometry parameter 135 is stored in the storage unit 130.

The model creating unit 250 performs model creation processing (step S216), and the learning processing ends.

Figure 15:
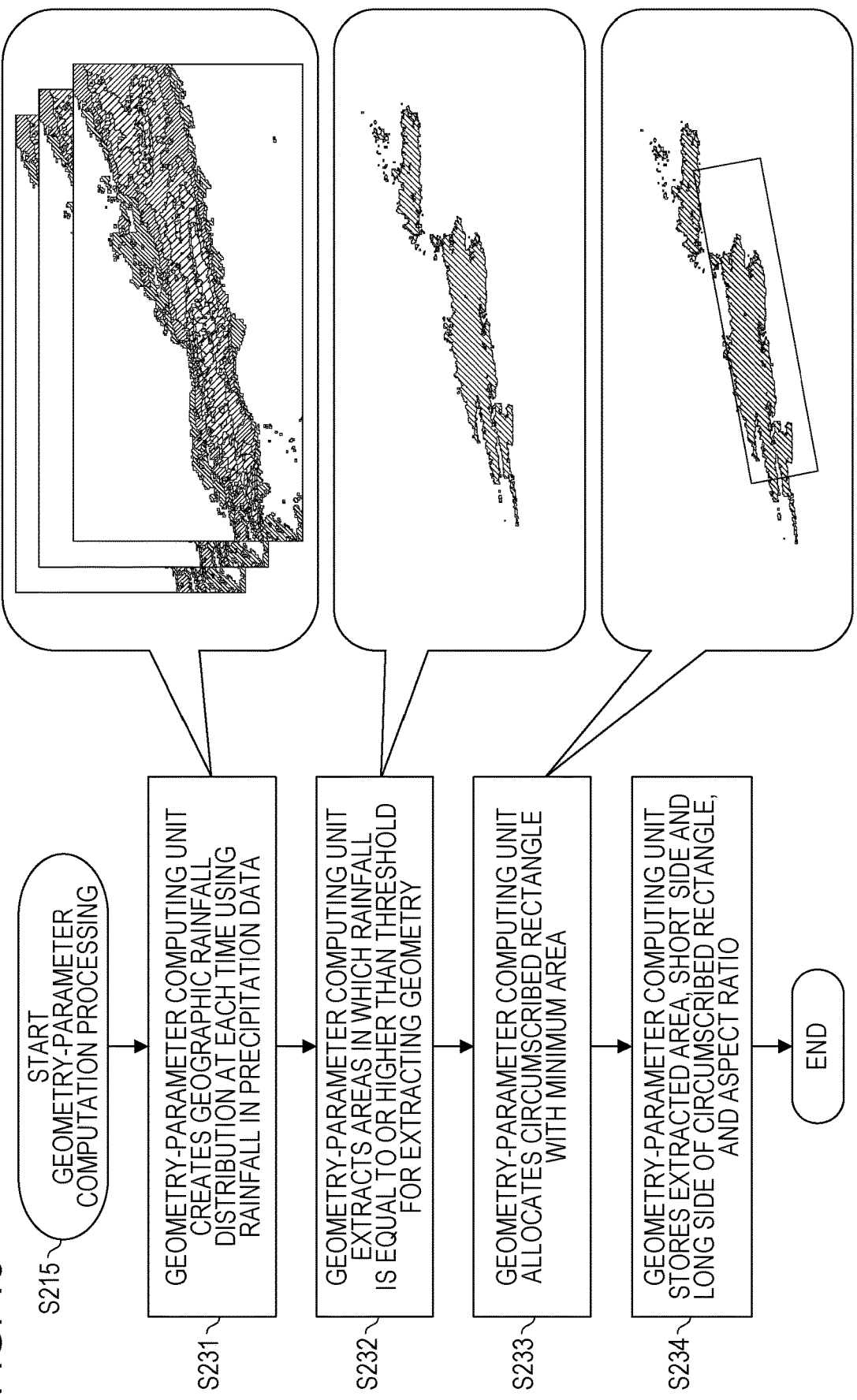
FIG. 15 is a flowchart for illustrating geometry-parameter computation processing performed by a geometry-parameter computing unit.

FIG. 15 is a flowchart for illustrating the geometry-parameter computation processing performed by the geometry-parameter computing unit. In FIG. 15, the geometry-parameter computing unit 240 creates geographical rainfall distribution using the rainfall in the precipitation data 132 at each time (step S231).

The geometry-parameter computing unit 240 extracts areas in which rainfall is equal to or higher than the threshold for extracting the geometry from the created rainfall distribution (step S232) and allocates a circumscribed rectangle with a minimum area to the extracted areas (step S233).

The geometry-parameter computing unit 240 stores the extracted areas, the short side and the long side of the circumscribed rectangle, and the aspect ratio as the geometry parameter 135 in the storage unit 130 (step S135) and terminates the geometry-parameter computation processing. The storage unit 130 stores the geometry parameter 135 on each time.

Figure 16:
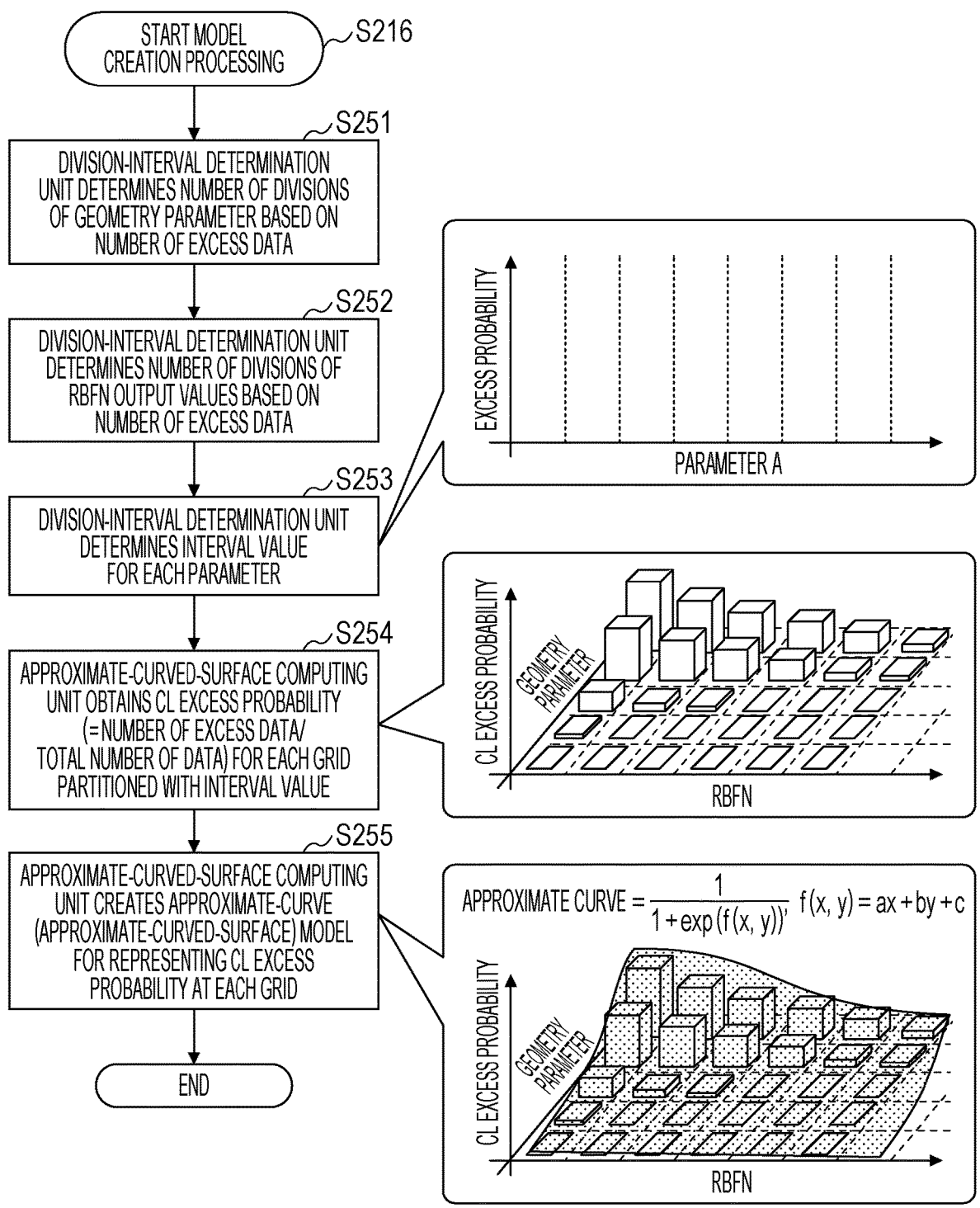
FIG. 16 is a flowchart for illustrating model creation processing performed by a model creating unit.

FIG. 16 is a flowchart for illustrating the model creation processing performed by the model creating unit 250. In FIG. 16, the division-interval determination unit 260 of the model creating unit 250 determines the number of divisions of the geometry parameter 135 based on the number of excess data (step S251). The division-interval determination unit 260 determines the number of divisions of the RBFN output values based on the number of excess data (step S252).

The division-interval determination unit 260 then determines an interval value for each parameter (step S253). The four kinds of value of the geometry parameter 135 and the RBFN output values correspond to the parameters. The interval value is set for each of the four kinds of value of the geometry parameter 135. The interval value is obtained by dividing the values at the individual times from the minimum value to the maximum value by the number of divisions.

Next, the approximate-curved-surface computing unit 270 finds CL excess probability=the number of excess data/the number of total data for each of the grids partitioned by the interval value (step S254). The CL excess probability is computed in a six-dimensional space defined by the four kinds of value of the geometry parameter, the RBFN output values, and the CL excess probability. Therefore, if the geometry of the precipitation zone differs, different CL excess probability is obtained even if the RBFN is the same.

The approximate-curved-surface computing unit 270 creates an approximate curve (an approximate curved surface) model (Eq. 1) for representing the CL excess probability at each grid (step S255). Thus, the coefficients a, b, c of the approximate curve model (Eq. 1) is obtained. The obtained coefficients a, b, c are stored in the storage unit 130 as the model coefficient data 138. Thereafter, the model creating unit 250 ends the model creation processing.

Figure 17:
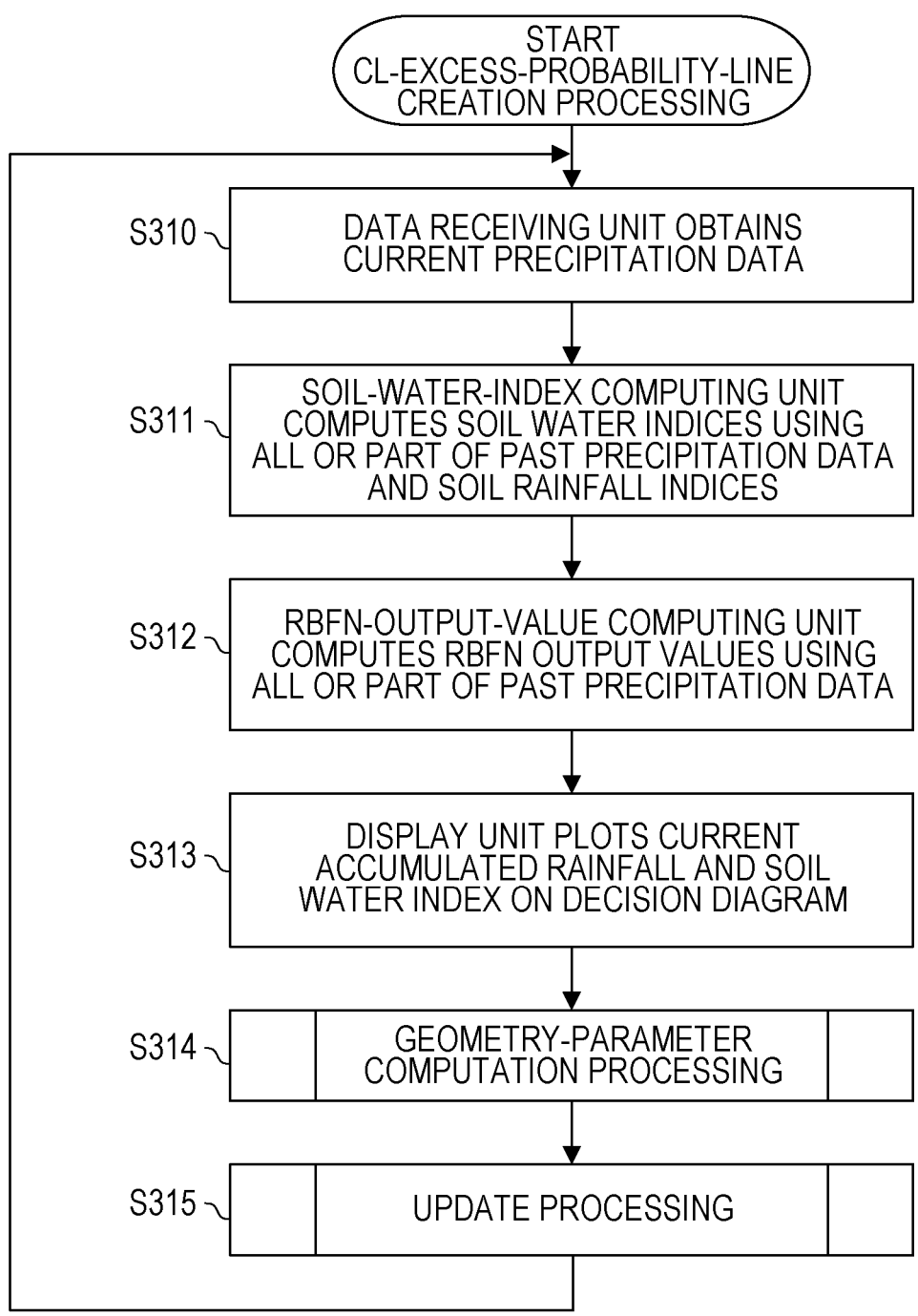
FIG. 17 is a flowchart for illustrating the entire CL-excess-probability-line creation processing performed by a CL-excess-probability-line creating unit.

FIG. 17 is a flowchart for illustrating the entire CL-excess-probability-line creation processing performed by the CL-excess-probability-line creating unit 300. In FIG. 17, the data receiving unit 310 of the CL-excess-probability-line creating unit 300 obtains current precipitation data 132 (step S310). The data receiving unit 310 obtains the current precipitation data 132 from the weather-data distribution source 400.

The soil-water-index computing unit 210 computes soil water indices using all or part of the past precipitation data 132 (step S311). The RBFN-output-value computing unit 220 computes RBFN output values using all or part of the past precipitation data 132 and the past soil water indices 133 (step S312). The display unit 370 plots the current accumulated rainfall and the current soil water index on the decision diagram 2$g$ (step S313).

The geometry-parameter computing unit 240 performs the geometry-parameter computation processing (step S314). The update unit 350 performs the update processing (step S315). The update unit 350 repeats the processing from step S310 to S315 at every update interval of the decision diagram 2$g$. Since the geometry-parameter computation processing performed by the geometry-parameter computing unit 240 is illustrated in FIG. 15, a detailed description thereof will be omitted.

Figure 18:
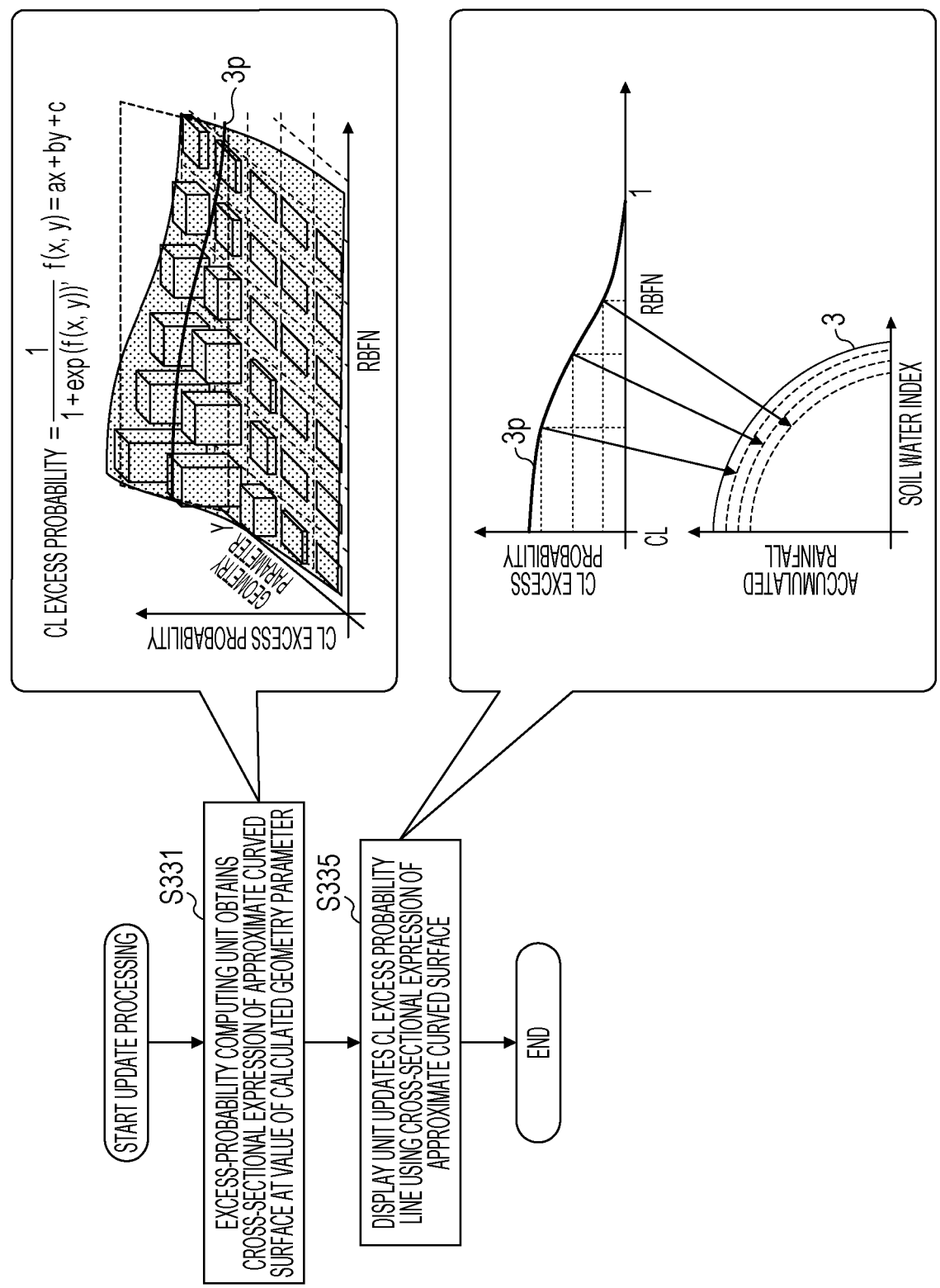
FIG. 18 is a flowchart for illustrating update processing performed by an update unit.

FIG. 18 is a flowchart for illustrating the update processing performed by the update unit 350. In FIG. 18, the excess-probability computing unit 360 of the update unit 350 obtains a cross-sectional expression 3$p$ of the approximate curved surface using the computed values of the geometry parameter 134 (step S331).

The excess-probability computing unit 360 obtains the approximate curve model (Eq. 1) from the settings 137, sets the values of the coefficients a, b, c obtained from the model coefficient data 138 in the approximate curve model, and specifies an approximate curve model to be used.

The excess-probability computing unit 360 obtains the cross-sectional expression 3$p$ of the approximate curved surface by applying the geometry parameter 135 obtained by the geometry-parameter computing unit 240 at step S314 in FIG. 17 to the variable y of the specified approximate curve model.

The display unit 370 updates the CL excess probability line using the cross-sectional expression 3$p$ of the approximate curved surface (step S335). The display unit 370 obtains an RBFN output value corresponding to the value of the display interval of the probability line designated by the settings 137 from the cross-sectional equation 3$p$ of the approximate curved surface. The display unit 370 computes the CL excess probability lines at the display intervals of the probability line based on the data on the accumulated rainfall and the soil water index corresponding to the obtained RBFN output value. Examples of the CL excess probability lines are lines of CL excess probability of 25%, 50%, and 75%. The display unit 370 displays the obtained CL excess probability lines on the decision diagram 2$g$ displayed. Thus, the display of the CL excess probability lines is updated, and the update processing ends.

Figure 19A:
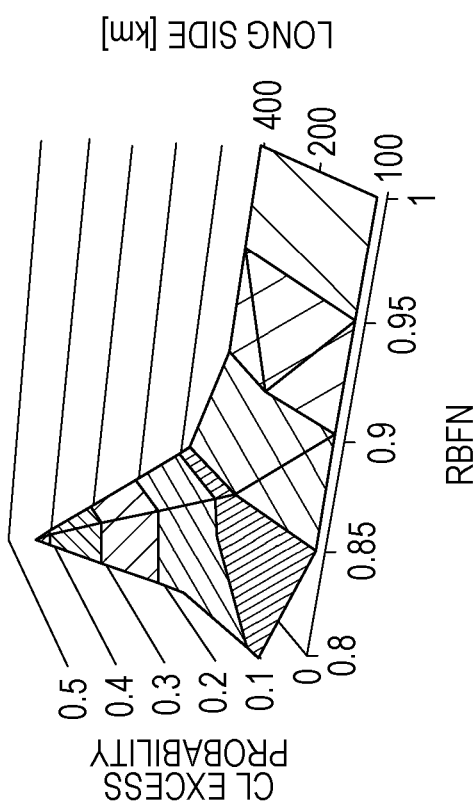
FIG. 19A is a diagram illustrating CL excess probability in a known technique in which a precipitation zone is not considered.
Figure 19B:
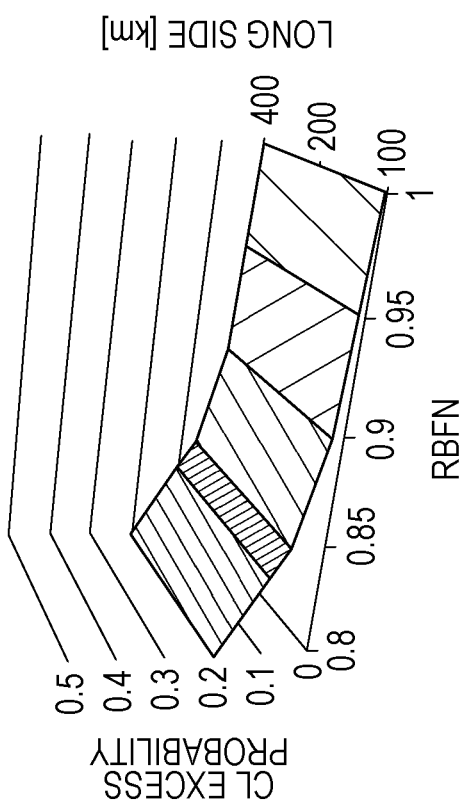
FIG. 19B a diagram illustrating CL excess probability in the present embodiment obtained in consideration of the precipitation zone.

FIGS. 19A and 19B illustrate examples of the CL excess probability depending on whether a precipitation zone is taken into consideration. FIGS. 19A and 19B respectively illustrate the results of computing the probability of exceeding the CL at the RBFN of 0.8 in the case where the long side of the precipitation zone is taken out of and into consideration using the probability distribution of actual data.

FIG. 19A illustrates CL excess probability in a known technique in which the precipitation zone is not considered. In FIG. 19A, the long side is plotted on the z-axis, but the geometry of the precipitation zone is not taken into consideration. Therefore, there is no change in CL excess probability due to a difference in the length of the long side. For example, if the RBFN output value is the same, the same CL excess probability is obtained.

In contrast, FIG. 19B illustrates CL excess probability in the present embodiment obtained in consideration of the precipitation zone. The CL excess probability depends on the length of the long side of the precipitation zone, so that different CL excess probabilities are obtained even if the RBFN output value is the same.

In the case where the long side is less than 100 km and the RBFN is equal to or greater than 0.8 and less than 0.85, two of 22 points exceed the CL at the next time in the actual data. Therefore, the CL excess probability is 2/22=0.10. Referring to FIG. 19A, the CL excess probability is 0.20, which is an overestimate. In contrast, in FIG. 19B, the CL excess probability is 0.09, which is substantially equal to the actual data.

If the long side is equal to or longer than 200 km and less than 400 km, and the RBFN is equal to or greater than 0.8 and less than 0.85, seven of 16 points exceed the CL at the next time, and the CL excess probability is 7/16=0.44. Referring to FIG. 19A, the CL excess probability is 0.20, which is an underestimate. In contrast, in FIG. 19B, the CL excess probability is 0.44, which is equal to the CL excess probability in actual data.

In FIG. 19A in which the geometry of the precipitation zone is not considered, there is no difference in CL excess probability depending on the length of the long side, the CL excess probability is uniformly 0.20. Thus, the use of the present embodiment increases the accuracy of CL excess probability.

Figure 20A:
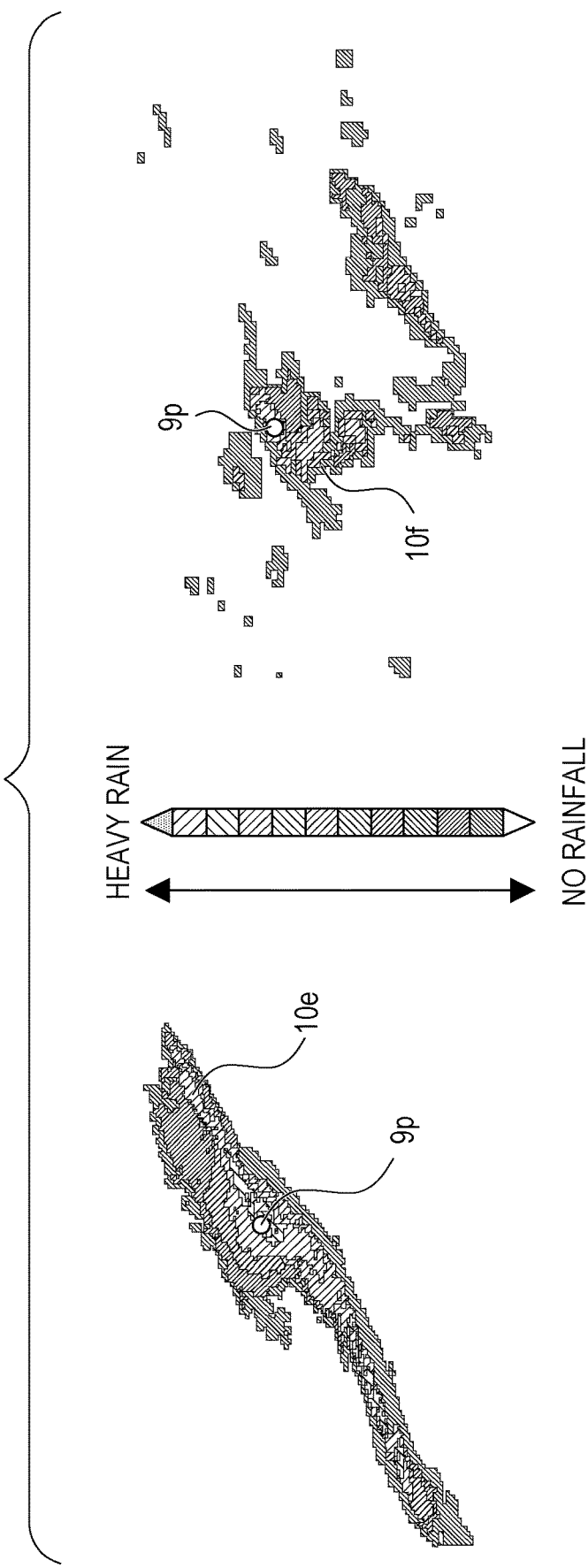
FIG. 20A is a diagram illustrating different precipitation zones over the same target point.
Figure 20B:
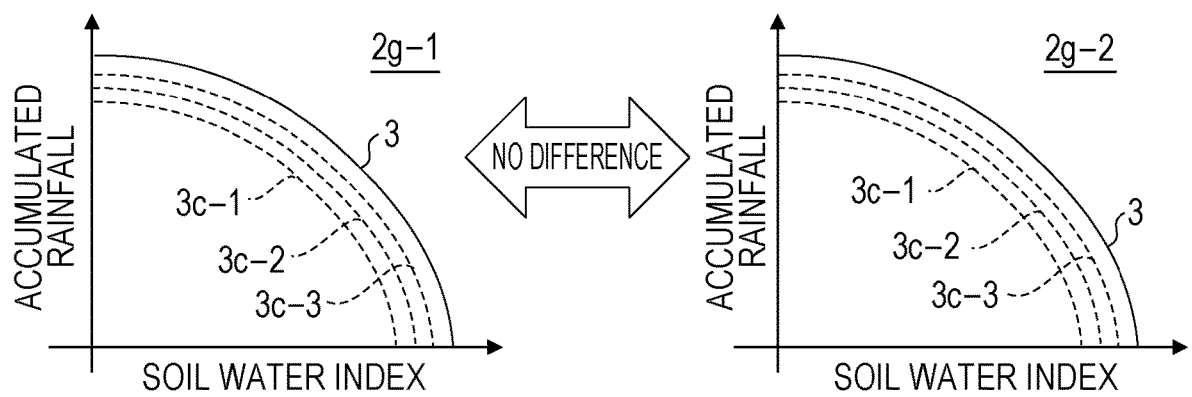
FIG. 20B illustrates graphs of examples of representation of CL-excess probability lines for the different precipitation zones in the known art.
Figure 20C:
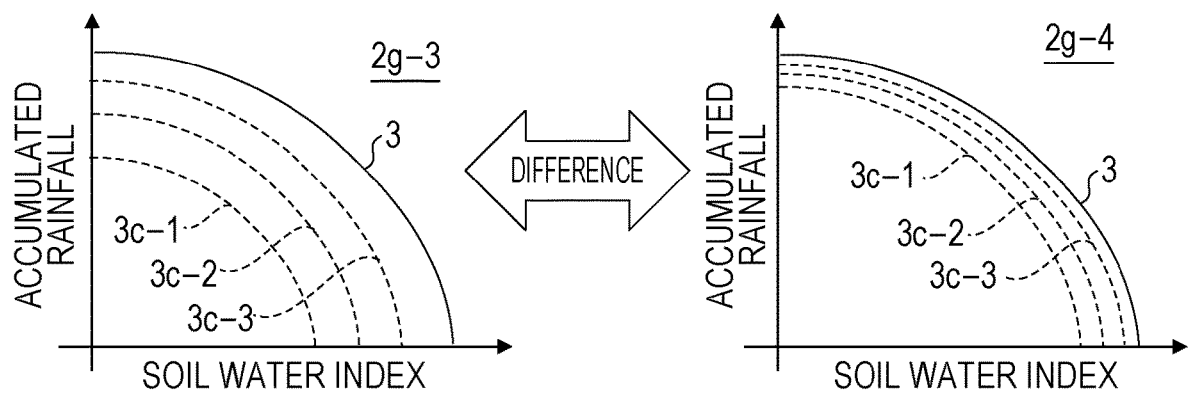
FIG. 20C illustrates graphs of examples of representation of CL-excess probability lines for the different precipitation zones in the embodiment.

Next, an example in which the indication of the CL excess probability line for the same target point changes depending on whether the present embodiment is applied. FIGS. 20A to 20C are diagrams illustrating comparative examples of the CL excess probability line in different precipitation zones.

FIG. 20A illustrates two precipitation zones 10$e$ and 10$f$ having different geometries formed over the same target point 9$p$. FIGS. 20B and 20C respectively illustrate examples of the decision diagram 2$g$ indicating the probability that the rainfalls in the precipitation zones 10$e$ and 10$f$ exceed the CL. FIGS. 20B and 20C illustrate CL excess probability lines 3$c$-1, 3$c$-2, and 3$c$-3 of 25%, 50%, and 75% by way of example, but this is given for mere illustrative purposes.

FIG. 20B illustrates an example of CL excess probability lines in the case where the present embodiment is not applied. A decision diagram 2$g$-1 corresponds to a display example in the case of the precipitation zone 10$e$. A decision diagram 2$g$-2 corresponds to a display example in the case of the precipitation zone 10f. There is no difference in the display interval of the CL excess probability lines 3c-1, 3c-2, and 3c-3 between the decision diagram 2g-1 and the decision diagram 2g-2. The CL excess probability lines 3c-1, 3c-2, and 3c-3 are displayed at the same intervals regardless of the geometry of the precipitation zone.

In contrast, FIG. 20C illustrates a display example of CL excess probability lines in the case where the present embodiment is applied. A decision diagram 2g-3 corresponds to a display example in the case of the precipitation zone 10e. A decision diagram 2g-4 corresponds to a display example in the case of the precipitation zone 10f. The display interval of the CL excess probability lines 3c-1, 3c-2, and 3c-3 differs between the decision diagram 2g-1 and the decision diagram 2g-2. The CL excess probability lines 3c-1, 3c-2, and 3c-3 are displayed at different intervals between the precipitation zone 10e and the precipitation zone 10f according to the geometry of the precipitation zone.

Thus, the present embodiment allows appropriate evaluation of CL excess probability by considering the geometry of the precipitation zone. In the present embodiment, the index used is the probability of exceeding the critical line (CL) (critical-line excess probability). This is given for mere illustrative purposes. Any similar information may be used as the index. The approximate curve model described above is an example of a computation model. The learning unit 200 is an example of a creating unit. The CL-excess-probability-line creating unit 300 is an example of a computing unit or a computation display unit. The computing unit 100 is an example of a display device.

It is to be understood that the present disclosure is not limited to the disclosed embodiments and that various modifications and changes may be made without departing from the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program for causing a computer to execute:
creating a computation model for computing an index for a sediment disaster at a specific point using first information on a geometry of a precipitation zone at the specific point, including long rainfall and short rainfall at the specific point, the first information being created from past precipitation data accumulated in an electronic memory;
computing the index for the sediment disaster using the created computation model with second information on the geometry of the precipitation zone at the specific point, the second information being created from newly input precipitation data, and the index is a probability of exceeding a critical line for an occurrence of the sediment disaster; and
displaying the index in a decision diagram to update a warning on a likelihood of sediment disaster at the specific point.

2. The storage medium according to claim 1, wherein the information on the geometry of the precipitation zone indicates at least a long side of a circumscribed rectangle of the precipitation zone.

3. The storage medium according to claim 2, wherein the information on the geometry of the precipitation zone further indicates at least one of a short side, an area, and a ratio of the long side to the short side.

4. The storage medium according to claim 2, wherein the index computed using the computation model increases as an output value obtained via a neural network decreases and the long side increases, the neural network using the long rainfall and the short rainfall as input values to generate the output value.

5. The storage medium according to claim 2, the program further causing a computer to execute:
displaying the computed index on a graph indicating a relationship between the long rainfall and the short rainfall and updating a representation on the graph with the index calculated each time precipitation data is obtained.

6. A method for computing an index on a sediment disaster, performed by a computer, the method comprising:
creating a computation model for computing the index for a sediment disaster at a specific point using information on a geometry of a precipitation zone at the specific point and long rainfall and short rainfall at the specific point, the information being created from past precipitation data accumulated in a memory;
computing the index on the sediment disaster using the computation model from the information on the geometry of the precipitation zone at the specific point, the information being created from the input precipitation data, and the index is a probability of exceeding a critical line for an occurrence of the sediment disaster; and
displaying the index in a decision diagram to update a warning on a likelihood of sediment disaster at the specific point.

7. An apparatus for computing an index on a sediment disaster comprising:
a memory; and
a processor coupled to the memory and configured to perform a process including:
creating a computation model for computing an index on a sediment disaster at a specific point using information on a geometry of a precipitation zone at the specific point, including long rainfall and short rainfall at the specific point, the information being created from past precipitation data accumulated in the memory;
computing the index on the sediment disaster using the computation model from the information on the geometry of the precipitation zone at the specific point, the information being created from the input precipitation data, and the index is a probability of exceeding a critical line for an occurrence of the sediment disaster; and
displaying the index in a decision diagram to update a warning on a likelihood of sediment disaster at the specific point.

8. A method for predicting a sediment disaster comprising:
accumulating, in a memory hardware, past precipitation data including information on a geometry of at least one precipitation zone including a selected locality and duration and amount of rainfall at the selected locality in the past;

generating a computational model for computing an index for a sediment disaster at the selected locality based on the accumulated past precipitation data in the memory hardware;
computing the index for the sediment disaster using the computational model with input precipitation data newer than past precipitation data;
updating a probability for the sediment disaster at the selected locality based on the new input precipitation data and the computed index; and
displaying the updated probability for the sediment disaster as a warning on a likelihood of sediment disaster at the selected locality.

* * * * *